(12) United States Patent
Yang et al.

(10) Patent No.: US 10,705,791 B2
(45) Date of Patent: Jul. 7, 2020

(54) VOLUME ADJUSTMENT METHOD AND TERMINAL

(71) Applicant: Huawei Technologies Co., Ltd., Shenzhen (CN)

(72) Inventors: Lin Yang, Beijing (CN); Fuzhou Xiao, Beijing (CN); Xiao Han, Beijing (CN); Junfeng Su, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/337,185

(22) PCT Filed: Jun. 27, 2017

(86) PCT No.: PCT/CN2017/090387
§ 371 (c)(1),
(2) Date: Mar. 27, 2019

(87) PCT Pub. No.: WO2018/059030
PCT Pub. Date: Apr. 5, 2018

(65) Prior Publication Data
US 2019/0227767 A1 Jul. 25, 2019

(30) Foreign Application Priority Data

Sep. 27, 2016 (CN) .......................... 2016 1 0857243
Mar. 31, 2017 (CN) .......................... 2017 1 0210512

(51) Int. Cl.
*H03G 3/32* (2006.01)
*G06F 3/16* (2006.01)
(Continued)

(52) U.S. Cl.
CPC .............. *G06F 3/165* (2013.01); *G10L 25/51* (2013.01); *G10L 25/84* (2013.01);
(Continued)

(58) Field of Classification Search
CPC ............ H03G 5/025; H03G 3/20; H03G 5/00; H03G 3/32; H04R 2430/01; H04S 2400/13; G06F 3/165
(Continued)

(56) References Cited

U.S. PATENT DOCUMENTS

| 7,869,768 B1 | 1/2011 | Vishlitzky |
| 8,542,817 B1 | 9/2013 | Short et al. |

(Continued)

FOREIGN PATENT DOCUMENTS

| CN | 103607500 A | 2/2014 |
| CN | 103873625 A | 6/2014 |

(Continued)

OTHER PUBLICATIONS

Machine Translation and Abstract of Chinese Publication No. CN103607500, Feb. 26, 2014, 18 pages.
(Continued)

*Primary Examiner* — Disler Paul
(74) *Attorney, Agent, or Firm* — Conley Rose, P.C.

(57) ABSTRACT

A volume adjustment method and a terminal relate to the field of terminal technologies and applied to adaptively adjust a volume during a voice conversation, and improve user experience. The terminal collects sound data during a voice conversation, where the sound data includes uplink voice data and background noise, and adjusts, when receiving downlink voice data, a volume of the downlink voice data based on the sound data.

20 Claims, 13 Drawing Sheets

(51) Int. Cl.
*H04M 1/60* (2006.01)
*G10L 25/51* (2013.01)
*G10L 25/84* (2013.01)
*H04M 1/725* (2006.01)

(52) U.S. Cl.
CPC ......... *H04M 1/6016* (2013.01); *H04M 1/725* (2013.01); *H04M 1/60* (2013.01); *H04M 1/72519* (2013.01)

(58) Field of Classification Search
USPC ..................................... 381/56–57, 104–109
See application file for complete search history.

(56) References Cited

U.S. PATENT DOCUMENTS

| | | | | |
|---|---|---|---|---|
| 8,744,091 | B2* | 6/2014 | Chen | G10L 21/0364 381/57 |
| 2009/0252350 | A1* | 10/2009 | Seguin | H03G 9/005 381/109 |
| 2010/0027812 | A1* | 2/2010 | Moon | H03G 3/32 381/107 |
| 2010/0080379 | A1* | 4/2010 | Chen | H04M 1/6016 379/390.01 |
| 2011/0305346 | A1* | 12/2011 | Daubigny | H03G 3/32 381/28 |
| 2014/0112498 | A1* | 4/2014 | Zong | H04R 3/005 381/107 |
| 2014/0270200 | A1* | 9/2014 | Usher | H04R 1/1041 381/57 |
| 2015/0193193 | A1* | 7/2015 | Khaira | G06F 3/165 381/109 |

FOREIGN PATENT DOCUMENTS

| | | |
|---|---|---|
| CN | 103973863 A | 8/2014 |
| CN | 104954922 A | 9/2015 |
| CN | 105025149 A | 11/2015 |
| CN | 105657165 A | 6/2016 |
| JP | 2008005025 A | 1/2008 |

OTHER PUBLICATIONS

Machine Translation and Abstract of Chinese Publication No. CN103973863, Aug. 6, 2014, 18 pages.
Machine Translation and Abstract of Chinese Publication No. CN105025149, Nov. 4, 2015, 21 pages.
Foreign Communication From a Counterpart Application, PCT Application No. PCT/CN2017/090387, English Translation of International Search Report dated Aug. 30, 2017, 2 pages.
Foreign Communication From a Counterpart Application, PCT Application No. PCT/CN2017/090387, English Translation of Written Opinion dated Aug. 31, 2017, 5 pages.
Foreign Communication From a Counterpart Application, European Application No. 17854484.7, Extended European Search Report dated Jul. 16, 2019, 7 pages.
Machine Translation and Abstract of Chinese Publication No. CN105657165, Jun. 8, 2016, 13 pages.
Machine Translation and Abstract of Japanese Publication No. JP2008005025, Jan. 10, 2008, 13 pages.
Machine Translation and Abstract of Chinese Publication No. CN104954922, Sep. 30, 2015, 6 pages.
Machine Translation and Abstract of Chinese Publication No. CN103873625, Jun. 18, 2014, 12 pages.
Foreign Communication From A Counterpart Application, Chinese Application No. 201780005521.8, Chinese Office Action dated Aug. 27, 2019, 10 pages.

* cited by examiner

US 10,705,791 B2

VOLUME ADJUSTMENT METHOD AND TERMINAL

CROSS-REFERENCE TO RELATED APPLICATIONS

This application is a U.S. National Stage of International Patent Application No. PCT/CN2017/090387 filed Jun. 27, 2017, which claims priority to Chinese Patent Application No. 201610857243.6 filed on Sep. 27, 2016 and Chinese Patent Application No. 201710210512.4 filed on Mar. 31, 2017. All of the aforementioned applications are hereby incorporated by reference in their entireties.

TECHNICAL FIELD

Embodiments of this application relate to the field of terminal technologies, and in particular, to a volume adjustment method and a terminal.

BACKGROUND

During use of a mobile phone, a volume is mostly set in such a manner that a system presets levels and a user proactively adjusts the volume based on a subjective feeling in use. For example, in a voice conversation, a volume of a receiver/speaker is proactively set by the user.

Currently, a volume adjustment of a mobile phone has begun to become intelligent. A current intelligent adjustment range of a mobile phone volume only relates to some music playing scenes, for example, a ringtone playing scene. However, in a mobile phone system, definitions and processing manners of music playing and a voice conversation are different. For a volume adjustment during a voice conversation, there has not been any related intelligent adjustment solution so far.

SUMMARY

Embodiments of this application provide a volume adjustment method and a terminal, to adaptively adjust a volume during a voice conversation, and improve user experience.

To achieve the foregoing objective, the following technical solutions are used in the embodiments of this application.

According to a first aspect, an embodiment of this application provides a volume adjustment method, including: A terminal collects sound data during a voice conversation. The sound data includes uplink voice data and background noise. Subsequently, when receiving downlink voice data, the terminal adjusts a volume of the downlink voice data based on the sound data.

In this way, the terminal may collect the sound data in real time during the voice conversation, so that the terminal can adjust the volume of the downlink voice data in real time, intelligently, and adaptively based on the sound data, thereby improving user experience in the voice conversation.

With reference to the first aspect, in a possible implementation, that the terminal adjusts a volume of the downlink voice data based on the sound data includes: The terminal adjusts the volume of the downlink voice data based on a volume parameter of the sound data. The volume parameter is used to describe volume value of the sound data.

In this way, the terminal may adaptively adjust volume value of the downlink voice data based on the volume value of the sound data.

With reference to the first aspect and the foregoing possible implementation, in another possible implementation, the volume parameter includes at least one of: an energy value, a power value, or an average volume value of the sound data.

In this way, the terminal may adjust the volume of the downlink voice data based on a specific volume parameter such as an energy value, a power value, or an average volume value.

With reference to the first aspect and the foregoing possible implementation, in another possible implementation, the terminal is provided with a first microphone, and that a terminal collects sound data includes: The terminal collects the sound data by using the first microphone. That is, the terminal may collect mixed data of the uplink voice data and the background noise by using a microphone.

With reference to the first aspect and the foregoing possible implementation, in another possible implementation, the terminal is provided with a second microphone and a third microphone, and that a terminal collects sound data includes: The terminal collects the sound data by using the second microphone. The method further includes: The terminal collects the background noise by using the third microphone. That is, the terminal may collect mixed data of the uplink voice data and the background noise by using a microphone, and collect the background noise by using another microphone.

With reference to the first aspect and the foregoing possible implementation, in another possible implementation, that the terminal adjusts the volume of the downlink voice data based on a volume parameter of the sound data includes: The terminal determines whether a volume parameter of the background noise is greater than or equal to a first preset value. If the volume parameter of the background noise is greater than or equal to the first preset value, the terminal adjusts the volume of the downlink voice data based on the volume parameter of the background noise. If the volume parameter of the background noise is less than the first preset value, the terminal adjusts the volume of the downlink voice data based on the volume parameter of the sound data.

In this way, the terminal may determine, based on volume value of the background noise, whether a current environment is a noisy environment scene or a normal environment scene, so as to adjust the volume of the downlink voice data by using different policies in different scenes.

With reference to the first aspect and the foregoing possible implementation, in another possible implementation, that the terminal adjusts the volume of the downlink voice data based on the volume parameter of the sound data includes: If the volume parameter of the sound data increases, or if the volume parameter of the sound data within preset duration is greater than or equal to a second preset value, the terminal increases the volume of the downlink voice data. If the increased volume of the downlink voice data is greater than or equal to a first threshold, the terminal adjusts the volume of the downlink voice data to the first threshold. If the increased volume of the downlink voice data is less than the first threshold, the terminal further determines whether the volume parameter of the sound data increases, or whether the volume parameter of the sound data within the preset duration is greater than or equal to the second preset value.

In this way, the terminal may increase the volume of the downlink voice data based on the volume parameter of the sound data when determining that a user increases a speaking volume or continues to speak loudly. This is consistent with a use feature that a user usually proactively increases a speaking volume when the user cannot hear downlink voice clearly in an actual voice conversation.

With reference to the first aspect and the foregoing possible implementation, in another possible implementation, that the volume parameter of the sound data increases includes: The volume parameter of the sound data is in a trend of increasing within the preset duration.

That is, when the volume parameter of the sound data does not strictly increase but is in a trend of increasing, it may also indicate that the volume parameter of the sound data increases.

With reference to the first aspect and the foregoing possible implementation, in another possible implementation, that the terminal adjusts the volume of the downlink voice data based on the volume parameter of the sound data includes: The terminal obtains the uplink voice data in the sound data. The terminal adjusts the volume of the downlink voice data based on a volume parameter of the uplink voice data.

In this way, the terminal can adjust the volume of the downlink voice data more accurately based on the volume parameter, in the sound data, of the uplink voice data that can more accurately reflect an actual speaking volume of the user.

With reference to the first aspect and the foregoing possible implementation, in another possible implementation, that the terminal adjusts the volume of the downlink voice data based on a volume parameter of the uplink voice data includes: If the volume parameter of the uplink voice data increases, or if the volume parameter of the uplink voice data within a preset unit time is greater than or equal to a third preset value, the terminal increases the volume of the downlink voice data. If the increased volume of the downlink voice data is greater than or equal to a third threshold, the terminal adjusts the volume of the downlink voice data to the third threshold. If the increased volume of the downlink voice data is less than the third threshold, the terminal further determines whether the volume parameter of the uplink voice data increases, or whether the volume parameter of the uplink voice data within the preset unit time is greater than or equal to the third preset value.

In this way, the terminal may increase the volume of the downlink voice data based on the volume parameter of the uplink voice data in the sound data when determining that a user increases a speaking volume or continues to speak loudly. Therefore, this is consistent with a use feature that a user usually proactively increases a speaking volume when the user cannot hear downlink voice clearly in an actual voice conversation.

With reference to the first aspect and the foregoing possible implementation, in another possible implementation, that the volume parameter of the uplink voice data increases includes: The volume parameter of the uplink voice data is in a trend of increasing within the preset duration.

That is, when the volume parameter of the uplink voice data does not strictly increase but is in a trend of increasing, it may also indicate that the volume parameter of the uplink voice data increases.

With reference to the first aspect and the foregoing possible implementation, in another possible implementation, that the terminal adjusts the volume of the downlink voice data based on the volume parameter of the background noise includes: The terminal calculates a target parameter, where the target parameter includes a difference between the volume parameter of the background noise and a volume parameter of the downlink voice data or a ratio of the volume parameter of the background noise to a volume parameter of the downlink voice data. If the target parameter is greater than or equal to a fourth preset value, the terminal increases the volume of the downlink voice data. If the increased volume of the downlink voice data is greater than or equal to a second threshold, the terminal adjusts the volume of the downlink voice data to the second threshold. If the increased volume of the downlink voice data is less than the second threshold, the terminal further determines whether the target parameter is greater than or equal to the fourth preset value.

In this way, the terminal may increase the volume of the downlink voice data based on the target parameter when determining that a volume of the background noise is greater than the volume of the downlink voice data, or a difference between a volume of the background noise and the volume of the downlink voice data is not large, so that the user can receive and listen to the downlink voice data more clearly.

With reference to the first aspect and the foregoing possible implementation, in another possible implementation, the method further includes: If the target parameter is less than the fourth preset value, when the volume parameter of the background noise decreases, the terminal decreases the volume of the downlink voice data.

In this way, when background noise in a noisy environment decreases, the terminal may decrease the volume of the downlink voice data to avoid poor user experience caused by an extremely high volume of the downlink voice data.

With reference to the first aspect and the foregoing possible implementation, in another possible implementation, that the volume parameter of the background noise decreases includes: A decreased value of the volume parameter of the background noise is greater than or equal to a fifth preset value.

In this way, when the volume parameter of the background noise decreases relatively greatly, the terminal may decrease the volume of the downlink voice data to avoid poor user experience caused by an extremely high volume of the downlink voice data.

With reference to the first aspect and the foregoing possible implementation, in another possible implementation, that the terminal adjusts a volume of the downlink voice data based on the sound data includes: When a difference between a fourth threshold and the volume of the downlink voice data is greater than or equal to a sixth preset value, the terminal adjusts the volume of the downlink voice data based on the sound data by using a first step size. When a difference between a fourth threshold and the volume of the downlink voice data is less than the sixth preset value, the terminal adjusts the volume of the downlink voice data based on the sound data by using a second step size. The second step size is less than the first step size.

In this way, the terminal may adjust the volume of the downlink voice data by using a large step size when a difference between the volume and a maximum volume threshold is relatively large, and adjust the volume of the downlink voice data by using a small step size when the volume is close to the maximum volume threshold, so that downlink speech distortion caused by an approach of audio parts to a saturation region is avoided as much as possible while an effect of adjusting the volume of the downlink voice data is achieved.

With reference to the first aspect and the foregoing possible implementation, in another possible implementation, after the adjusting, by the terminal, a volume of the downlink voice data, the method further includes: The terminal triggers prompt information, where the prompt information includes a visual cue and/or an auditory cue, and the prompt information is used to prompt an adjustment already made to the volume of the downlink voice data.

Therefore, the user can be reminded in a timely manner that the volume of the downlink voice data has been adaptively adjusted, thereby improving use experience of the user.

With reference to the first aspect and the foregoing possible implementation, in another possible implementation, the method further includes: If the terminal detects indication information of a user, the terminal stops adjusting the volume of the downlink voice data. The indication information is used to instruct to increase or decrease the volume of the downlink voice data.

Therefore, when the user proactively adjusts the volume of the downlink voice data, the proactive adjustment by the user prevails.

With reference to the first aspect and the foregoing possible implementation, in another possible implementation, the method further includes: The terminal records a setting operation of the user, where the setting operation includes a volume setting and a voice conversation manner.

This can facilitate statistics collection and help further improve the volume setting or the audio device.

According to a second aspect, an embodiment of this application provides a terminal, including: At least one microphone is configured to collect sound data during a voice conversation. The sound data includes uplink voice data and background noise. A receiving unit is configured to receive downlink voice data. An adjustment unit is configured to adjust a volume of the downlink voice data based on the sound data when the receiving unit receives the downlink voice data.

With reference to the second aspect, in a possible implementation, the adjustment unit is specifically configured to: adjust the volume of the downlink voice data based on a volume parameter of the sound data, where the volume parameter is used to describe volume value of the sound data.

With reference to the second aspect and the foregoing possible implementation, in another possible implementation, the volume parameter includes at least one of: an energy value, a power value, or an average volume value of the sound data.

With reference to the second aspect and the foregoing possible implementation, in another possible implementation, the at least one microphone includes a first microphone, and the first microphone is configured to collect the sound data.

With reference to the second aspect and the foregoing possible implementation, in another possible implementation, the at least one microphone includes a second microphone and a third microphone, the second microphone is configured to collect the sound data; and the third microphone is configured to collect the background noise.

With reference to the second aspect and the foregoing possible implementation, in another possible implementation, the adjustment unit is specifically configured to: determine whether a volume parameter of the background noise is greater than or equal to a first preset value; and if the volume parameter of the background noise is greater than or equal to the first preset value, adjust the volume of the downlink voice data based on the volume parameter of the background noise; or if the volume parameter of the background noise is less than the first preset value, adjust the volume of the downlink voice data based on the volume parameter of the sound data.

With reference to the second aspect and the foregoing possible implementation, in another possible implementation, the adjustment unit is specifically configured to: if the volume parameter of the sound data increases, or if the volume parameter of the sound data within preset duration is greater than or equal to a second preset value, increase the volume of the downlink voice data; and if the increased volume of the downlink voice data is greater than or equal to a first threshold, adjust the volume of the downlink voice data to the first threshold; or if the increased volume of the downlink voice data is less than the first threshold, further determine whether the volume parameter of the sound data increases, or whether the volume parameter of the sound data within the preset duration is greater than or equal to the second preset value.

With reference to the second aspect and the foregoing possible implementation, in another possible implementation, the terminal further includes: an obtaining unit, configured to obtain the uplink voice data in the sound data. The adjustment unit is specifically configured to: adjust the volume of the downlink voice data based on a volume parameter of the uplink voice data.

With reference to the second aspect and the foregoing possible implementation, in another possible implementation, the adjustment unit is specifically configured to: if the volume parameter of the uplink voice data increases, or if the volume parameter of the uplink voice data within a preset unit time is greater than or equal to a third preset value, increase the volume of the downlink voice data; and if the increased volume of the downlink voice data is greater than or equal to a third threshold, adjust the volume of the downlink voice data to the third threshold; or if the increased volume of the downlink voice data is less than the third threshold, further determine whether the volume parameter of the uplink voice data increases, or whether the volume parameter of the uplink voice data within the preset unit time is greater than or equal to the third preset value.

With reference to the second aspect and the foregoing possible implementation, in another possible implementation, the adjustment unit is specifically configured to: calculate a difference between the volume parameter of the background noise and a volume parameter of the downlink voice data or a ratio of the volume parameter of the background noise to a volume parameter of the downlink voice data; if the difference is greater than or equal to a fourth preset value, or a ratio is greater than or equal to a fifth preset value, increase the volume of the downlink voice data; and if the increased volume of the downlink voice data is greater than or equal to a second threshold, adjust the volume of the downlink voice data to the second threshold; or if the increased volume of the downlink voice data is less than a second threshold, further determine whether a target parameter is greater than or equal to the fourth preset value.

With reference to the second aspect and the foregoing possible implementation, in another possible implementation, the adjustment unit is further configured to: if the target parameter is less than the fourth preset value, when the volume parameter of the background noise decreases, decrease the volume of the downlink voice data.

With reference to the second aspect and the foregoing possible implementation, in another possible implementation, that the volume parameter of the background noise decreases includes: A decreased value of the volume parameter of the background noise is greater than or equal to a fifth preset value.

With reference to the second aspect and the foregoing possible implementation, in another possible implementation, that the adjustment unit is specifically configured to adjust the volume of the downlink voice data based on the sound data includes: when a difference between a fourth threshold and the volume of the downlink voice data is greater than or equal to a sixth preset value, adjusting the volume of the downlink voice data based on the sound data by using a first step size; and when a difference between a fourth threshold and the volume of the downlink voice data is less than the sixth preset value, adjusting the volume of the downlink voice data based on the sound data by using a second step size, where the second step size is less than the first step size.

With reference to the second aspect and the foregoing possible implementation, in another possible implementation, the terminal further includes: a prompting unit, configured to trigger prompt information, where the prompt information includes a visual cue and/or an auditory cue, and the prompt information is used to prompt an adjustment already made to the volume of the downlink voice data.

With reference to the second aspect and the foregoing possible implementation, in another possible implementation, the terminal further includes: a processing unit, configured to: when indication information of a user that is used to instruct to increase or decrease the volume of the downlink voice data is detected, stop adjusting the volume of the downlink voice data.

According to a third aspect, a terminal is provided. The terminal may include a processor, a memory, a bus, and at least one microphone. The microphone is configured to collect sound data. The processor and the memory are connected to each other by using the bus. The memory is configured to store a computer executable instruction. When the terminal operates, the processor executes the computer executable instruction stored in the memory, so that the terminal performs the volume adjustment method according to the first aspect or any possible implementation of the first aspect.

According to a fourth aspect, a computer readable storage medium is provided. The computer readable storage medium may include a computer instruction. When the computer instruction runs on a terminal, the terminal performs the volume adjustment method according to the first aspect or any possible implementation of the first aspect.

According to a fifth aspect, a computer program product including a computer instruction is provided. When the computer program product runs on a terminal, the terminal performs the volume adjustment method according to the first aspect or any possible implementation of the first aspect.

For descriptions of related content and technical effects of the second aspect to the fifth aspect, refer to related descriptions of related content and technical effects of the first aspect or any possible implementation of the first aspect. Details are not described herein again.

DESCRIPTION OF EMBODIMENTS

For ease of understanding, examples of descriptions of some concepts related to the embodiments of this application are provided as follows for reference:

downlink voice data: user voice data sent by a terminal to another device;

downlink voice data: user voice data sent by another device and received by a terminal;

background noise: also referred to as ground noise or ambient noise, is interference sound unrelated to a wanted signal; and volume: also referred to as loudness or sound intensity, indicating magnitude or intensity of sound.

In the descriptions of the embodiments of this application, unless otherwise stated, "I" represents an OR meaning, for example, A/B may represent A or B; and "and/or" in this specification is merely an association relationship for describing associated objects and represents that three relationships may exist. For example, A and/or B may represent the following three cases: only A exists, both A and B exist, and only B exists. In addition, in the descriptions of the embodiments of this application, "a plurality of" represents two or more.

Figure 1:
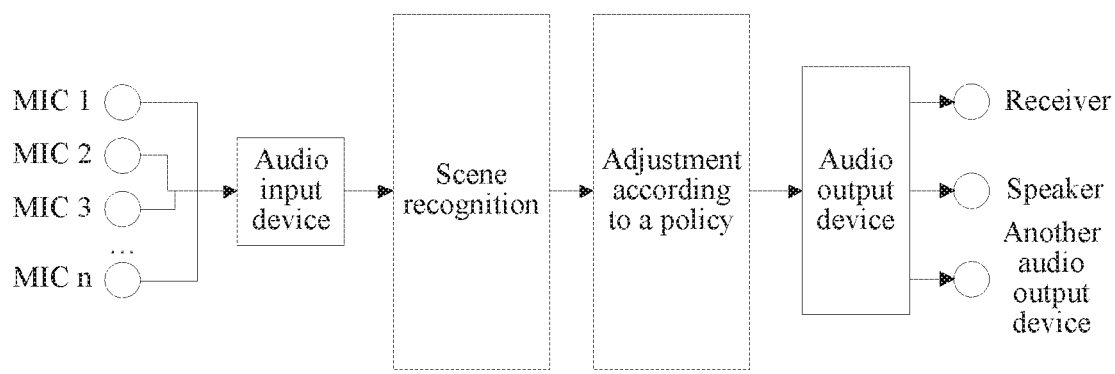
FIG. 1 is a flowchart of a volume adjustment method according to an embodiment of this application.

During a voice conversation, to intelligently adjust a volume of downlink voice data, the embodiments of this application provide a volume adjustment method and a terminal. Referring to FIG. 1, the terminal may collect sound data in real time in the voice conversation by using an audio input device, that is, a microphone. The sound data herein may include uplink voice data and background noise. In this way, scene recognition can be performed based on the collected sound data, and a volume of downlink voice data output by an audio output device is adaptively adjusted based on a volume adjustment policy corresponding to a specific scene, thereby improving user experience.

The following describes implementations of the embodiments of this application in detail with reference to accompanying drawings.

It should be noted that the volume adjustment method provided in the embodiments of this application is applicable to a terminal device that can be used in a voice conversation. The voice conversation herein may be a mobile phone conversation, a walkie-talkie conversation, a voice conversation in an online voice chat or an online video chat, or the like. For example, the terminal device may be a mobile phone, a walkie-talkie, a tablet computer, a notebook computer, an ultra-mobile personal computer (ultra-mobile personal computer, UMPC), a netbook, a personal digital assistant (personal digital assistant, PDA), or the like. The terminal in the embodiments of this application may be a touchscreen device, or a non-touchscreen device. This is not specifically limited herein.

Specifically, in the embodiments of this application, the volume adjustment method provided in the present invention is described by using an example in which the terminal device is a mobile phone. The following specifically describes components of the mobile phone 100 with reference to the accompanying drawings.

Figure 2A:
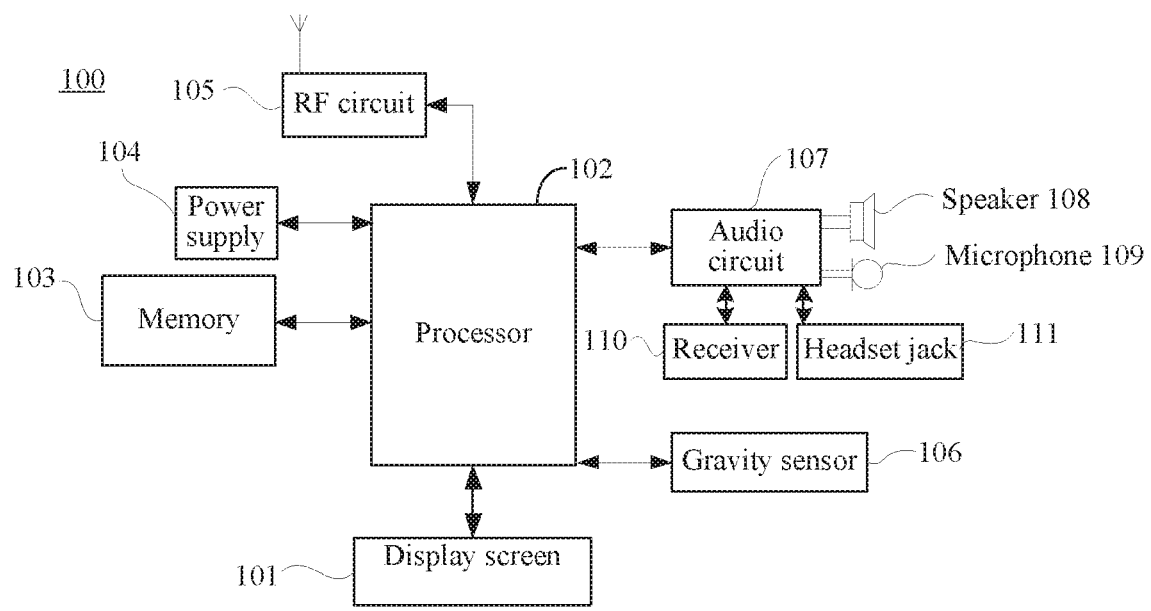
FIG. 2a is a schematic structural diagram of a mobile phone according to an embodiment of this application.

As shown in FIG. 2a, a mobile phone 100 may include components such as a display screen 101, a processor 102, a memory 103, a power supply 104, a radio frequency (radio frequency, RF) circuit 105, a gravity sensor 106, an audio circuit 107, a speaker 108, a microphone 109, a receiver 110, and a headset jack 111. These components may be connected to each other by using a bus, or may be directly connected to each other. A person skilled in the art may understand that the structure of the mobile phone shown in FIG. 1 does not constitute any limitation to the mobile phone, and the mobile phone may include more components than those shown in the figure, or some components may be combined, or a different component deployment may be used.

The display screen 101 belongs to a user interface (user interface, UI). The display screen 101 may include a display panel, or may include a touch panel.

The processor 102 is a control center of the mobile phone 100, and is connected to various parts of the entire mobile phone by using various interfaces and lines. By running or executing the software program and/or module stored in the memory 103, and invoking data stored in the memory 103, the processor 102 performs various functions and data processing of the mobile phone 100, thereby performing overall monitoring on the mobile phone 100. During specific implementation, in an embodiment, the processor 102 may include one or more processing units. The processor 102 may integrate an application processor and a modem processor. The application processor mainly processes an operating system, a user interface, an application program, and the like. The modem processor mainly processes wireless communication. It may be understood that the foregoing modem processor may alternatively not be integrated into the processor 102.

The memory 103 may be configured to store data, a software program, and a module, and may be a volatile memory (volatile memory), for example, a random access memory (random-access memory, RAM); or a non-volatile memory (non-volatile memory), for example, a read-only memory (read-only memory, ROM), a flash memory (flash memory), a hard disk drive (hard disk drive, HDD), or a solid-state drive (solid-state drive, SSD); or a combination of the foregoing types of memories. Specifically, the memory 103 may store program code, and the program code is used to enable the processor 102 to perform the volume adjustment method provided in the embodiments of this application by executing the program code.

The power supply 104 may be a battery, and is logically connected to the processor 102 by using a power management system, thereby implementing functions such as charging, discharging, and power consumption management by using the power management system.

The RF circuit 105 may be configured to receive and send signals during an information receiving and sending process or a call process. Particularly, the RF circuit 105 sends received information to the processor 102 for processing, and sends a signal generated by the processor 102. Generally, the RF circuit includes, but is not limited to, an antenna, at least one amplifier, a transceiver, a coupler, a low noise amplifier (low noise amplifier, LNA), and a duplexer. In addition, the RF circuit 105 may also communicate with a network and another device by means of wireless communication.

The gravity sensor (gravity sensor) 106 may detect magnitude of accelerations of a mobile phone in various directions (which are generally triaxial), may detect magnitude and a direction of gravity when the mobile phone is static, and may be used for an application that identifies a mobile phone gesture (for example, switching between a horizontal screen and a vertical screen, a related game, and magnetometer gesture calibration), a function related to vibration identification (for example, a pedometer and a knock), and the like. It should be noted that the mobile phone 100 may further include other sensors, such as a pressure sensor, an optical sensor, a gyroscope, a barometer, a hygrometer, a thermometer, an infrared sensor. Details are not described herein.

The audio circuit 107, the speaker 108, the microphone 109, the receiver 110, and the headset jack 111 may provide audio interfaces between a user and the mobile phone 100. The audio circuit 107 may convert received audio data into an electrical signal and transmit the electrical signal to the speaker 108. The speaker 108 converts the electrical signal into an audio signal and outputs the audio signal. On the other hand, the microphone 109 may convert a collected audio signal into an electrical signal. The audio circuit 107 receives the electrical signal, converts the electrical signal into audio data, and then outputs the audio data to the RF circuit 105, to send the audio data to, for example, another mobile phone; or outputs the audio data to the processor 102 for further processing. Specifically, the mobile phone 100 may include a plurality of microphones 109.

Figure 2B:
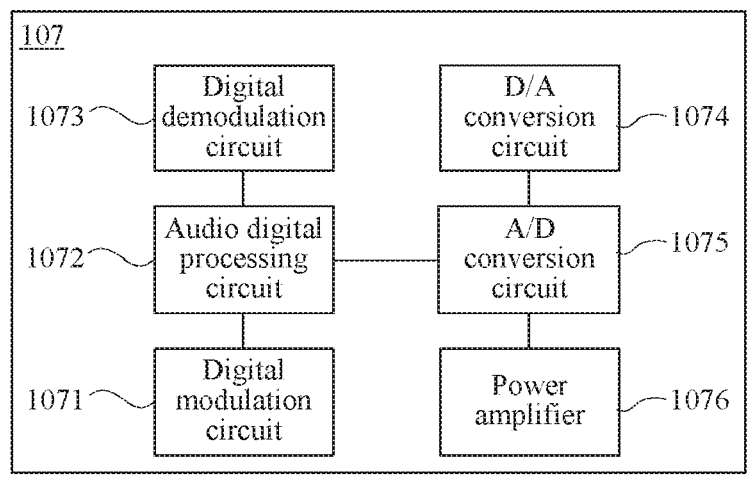
FIG. 2b is a schematic structural diagram of an audio circuit according to an embodiment of this application.

Referring to FIG. 2b, the audio circuit 107 may include a digital modulation circuit 1071, a digital processing circuit 1072, a digital demodulation circuit 1073, a digital/analog (D/A) conversion circuit 1074, and an analog/digital (A/D) conversion circuit 1075, and may include a power amplifier 1076.

During call answering, the digital demodulation circuit 1073 demodulates a signal received from the RF circuit 105, to extract a voice signal. The digital processing circuit 1072 performs decryption, de-interleaving, recombination, and other processing on the voice signal, and then performs channel decoding and speech decoding to obtain a digital voice signal. The digital voice signal is sent to the D/A conversion circuit 1074 to be restored to an analog audio signal. The analog audio signal is amplified by the power amplifier 1076, to drive the receiver 110 to produce sound. If a call is received in a hands-free mode, after the analog audio signal is amplified, the speaker 108 is driven to produce sound.

During call making, the microphone 109 converts a collected audio signal into an analog audio signal. After being amplified by the power amplifier (for example, a smart PA) 1076, the analog audio signal is sent to the A/D conversion circuit 1075, to obtain a digital audio signal (or the audio signal collected by the microphone may be directly sent to the A/D conversion circuit 1075, and the A/D conversion circuit and the D/A conversion circuit in the audio circuit 107 may be alternatively referred to as codec conversion circuits). The digital audio signal herein may be a pulse code modulation (Pulse Code Modulation, PCM) signal. Subsequently, after a series of processing such as speech encoding, channel encoding, encryption, and interleaving by the digital processing circuit 1072, the digital audio signal is sent to the digital modulation circuit 1071 for modulation, to generate an audio signal. In addition, the audio signal is encoded by a protocol modem and is then sent to the RF circuit 105 by using a baseband signal, to obtain a transmit intermediate frequency by means of modulation.

In a possible implementation, the digital modulation circuit 1071, the digital processing circuit 1072, the digital demodulation circuit 1073, the D/A conversion circuit 1074, and an A/D conversion circuit 1075 may be integrated in a digital signal processing chip (digital signal processing, DSP). It may be understood that the power amplifier 1076 may or may not be integrated into the digital signal processing chip.

In another possible implementation, the audio circuit 107 may be alternatively integrated into the processor 103.

Although not shown, the mobile phone 100 may further include a functional module such as a Wireless Fidelity (wireless fidelity, WiFi) module, a Bluetooth module, or a camera. Details are not described herein.

To make an objective, technical solutions, and advantages of the embodiments of this application clearer, the following describes in detail the volume adjustment method provided in the embodiments of this application in combination with specific components in the mobile phone 100 shown in FIG. 2. Shown steps may be alternatively performed in any terminal device other than the mobile phone shown in FIG. 1. In addition, although a logical sequence of the volume adjustment method provided in the embodiments of this application is shown in a method flowchart, in some cases, the shown or described steps may be performed in a sequence different from the sequence herein.

Figure 3:
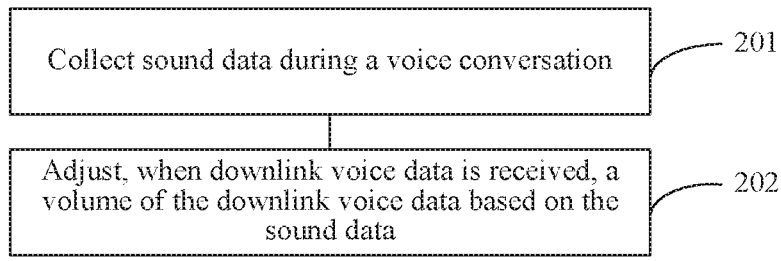
FIG. 3 is a flowchart of another volume adjustment method according to an embodiment of this application.

Referring to FIG. 3, a volume adjustment method provided in an embodiment of this application may include the following steps.

201. A terminal collects sound data during a voice conversation, where the sound data includes uplink voice data and background noise.

The uplink voice data refers to voice content currently input by a user during the voice conversation, and is voice data that the user currently intends to send to another user. The background noise is interference sound unrelated to the uplink voice data in the voice conversation.

During the voice conversation, the terminal may collect the sound data in real time by using a microphone.

202. The terminal adjusts, when receiving downlink voice data, a volume of the downlink voice data based on the sound data.

The downlink voice data herein is user voice data received by the terminal from another device during the voice conversation. With reference to FIG. 2a and FIG. 2b, the downlink voice data received by the terminal is a digital signal, and the downlink voice data heard by the user by using the receiver or the speaker is an analog audio signal. Therefore, the terminal may specifically adjust the volume of the downlink voice data by adjusting an amplitude of a downlink digital voice signal, and/or after the downlink digital voice signal is converted into an analog audio signal, the terminal may adjust the volume of the downlink voice data by adjusting a gain of the power amplifier.

It can be learned that in this embodiment of this application, the terminal may collect the sound data in real time during the voice conversation, so that the terminal can adjust the volume of the downlink voice data in real time, intelligently, and adaptively based on the sound data, thereby improving user experience in the voice conversation.

Specifically, that the terminal adjusts a volume of the downlink voice data based on the sound data in step 202 may include the following step.

2020. The terminal adjusts the volume of the downlink voice data based on a volume parameter of the sound data, where the volume parameter is used to describe volume value of the sound data.

The volume parameter may describe the volume value of the sound data, and the terminal adjusts the volume of the downlink voice data based on the volume parameter of the sound data. That is, the terminal may adjust the volume of the downlink voice data based on the volume value of the sound data. In this embodiment of this application, a larger volume parameter of the sound data may indicate a higher volume of the sound data A smaller volume parameter of the sound data may indicate a smaller volume of the sound data. For example, the volume parameter may include at least one of an energy value, a power value, or an average volume value of the sound data, and some other parameters. Examples of the parameters are not provided one by one herein.

It may be understood that the volume parameter, that is, the energy value, the power value, or the average volume value usually corresponds to a time period, and is an energy value, a power value, or an average volume value of the sound data within the time period.

Figure 4A:
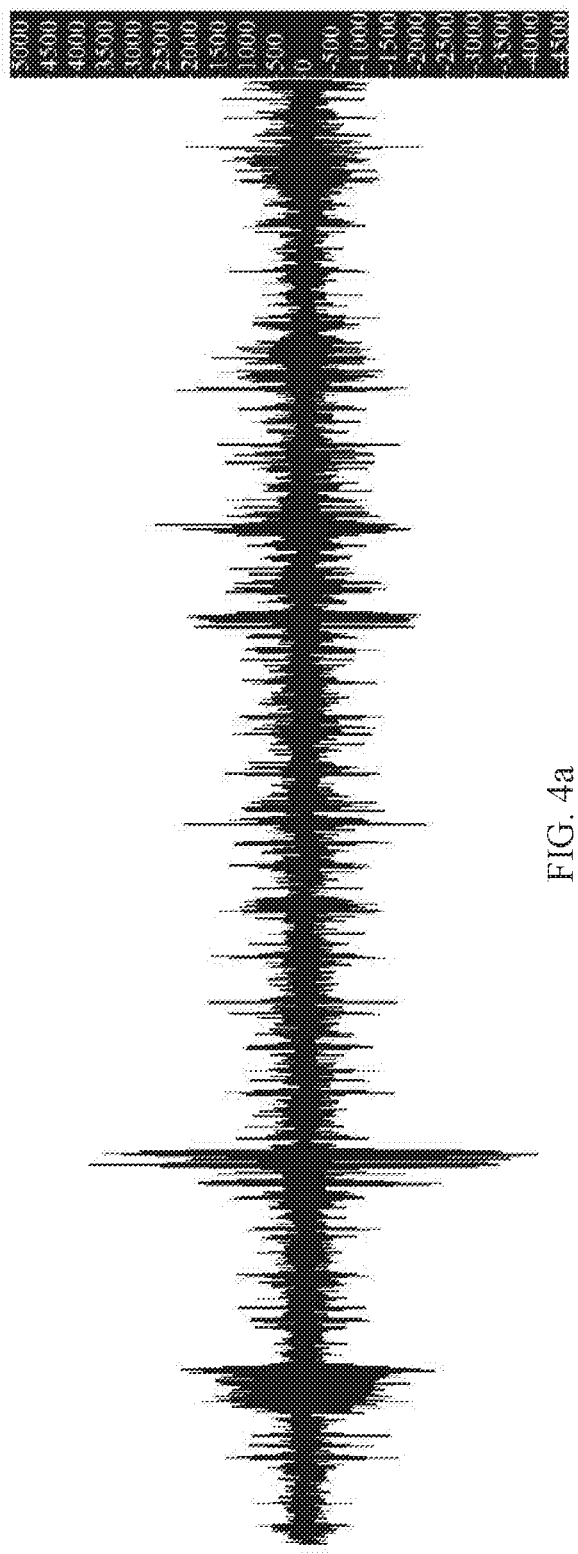
FIG. 4a is a schematic diagram of a digital signal waveform according to an embodiment of this application.
Figure 4B:
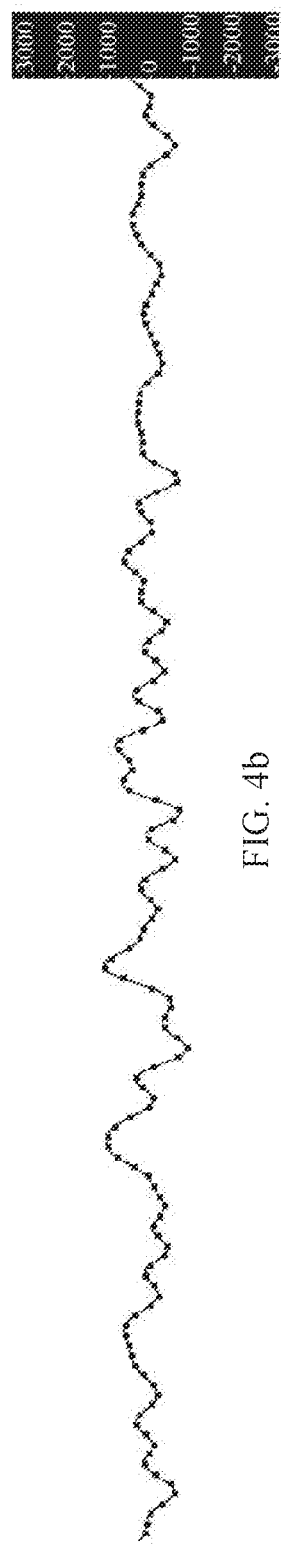
FIG. 4b is a schematic diagram of another digital signal waveform according to an embodiment of this application.

For example, for a PCM digital signal waveform corresponding to the sound data, refer to FIG. 4a. A lateral axis represents time, and corresponds to a plurality of collection points. For a PCM digital signal waveform obtained after a time axis in FIG. 4a is expanded, refer to FIG. 4b. In FIG. 4b, an amplitude value of each collection point represents magnitude of a current instantaneous A/D collection value, that is, represents an amplitude value of sound at a current instantaneous point.

After a PCM digital signal is obtained, a Fourier transform may be performed on the PCM digital signal, to obtain a spectrum feature of an audio signal within a time period T (for example, a unit time). An energy value of the audio signal within the time period T may be calculated based on the spectrum feature. Specifically, the energy value may be a value that is obtained by means of a summation by performing cumulative square calculation on a transform result after the Fourier FFT transform is performed on the PCM digital signal. In a simplified calculation manner, the energy value is equal to a summation of squared amplitude values of collection points of all PCM digital signals within the time period T.

The power value is obtained after the energy value is divided by a quantity of collection points within the time period T. The average volume value is obtained after a summation of amplitude values of the collection points of all the PCM digital signals within the time period T is divided by a quantity of collection points within a unit time.

An actual voice conversation process may include different application scenes. In this embodiment of this application, the terminal may use a corresponding intelligent adjustment policy for a corresponding specific scene during a voice conversation, to adaptively adjust the volume of the downlink voice data. The following provides detailed descriptions based on different scenes.

Figure 5:
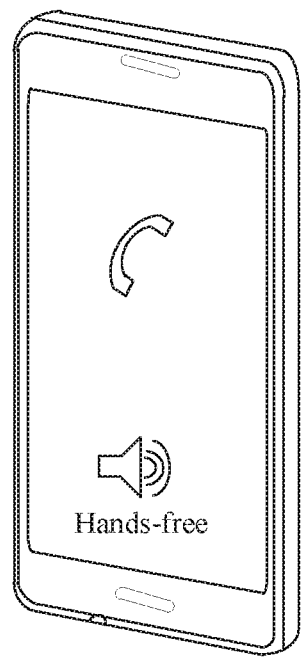
FIG. 5 is a schematic diagram of a hands-free scene according to an embodiment of this application.

A hands-free scene:

In the hands-free scene shown in FIG. 5, the user receives and listens to downlink voice data by using the speaker during a voice conversation.

In an implementation, the terminal is provided with a first microphone. That the terminal collects sound data in step 201 may include: The terminal collects the sound data by using the first microphone. The sound data herein is mixed data of the uplink voice data and the background noise.

It should be noted that the terminal is not limited to being provided with only the first microphone, and the terminal may be further provided with another microphone. This is not limited herein.

Figure 6A:
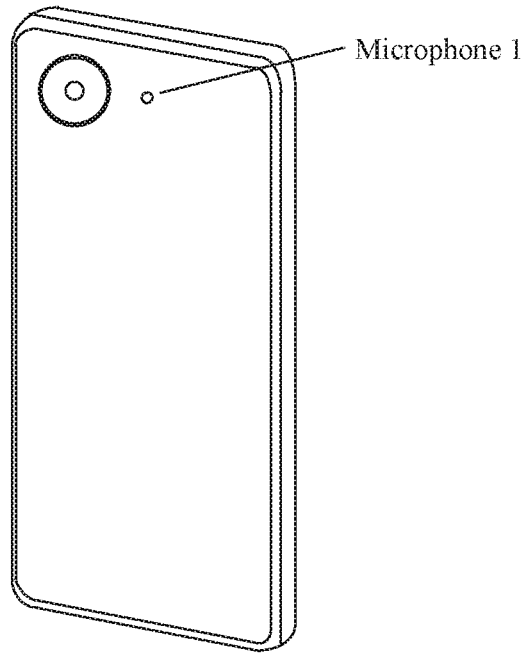
FIG. 6a is a schematic diagram of a microphone location according to an embodiment of this application.

For example, referring to FIG. 6*a*, the terminal is provided with a microphone 1. The microphone 1 is the first microphone. In the hands-free scene, the first microphone is turned on to collect data obtained by mixing current uplink voice data and background noise.

Figure 6B:
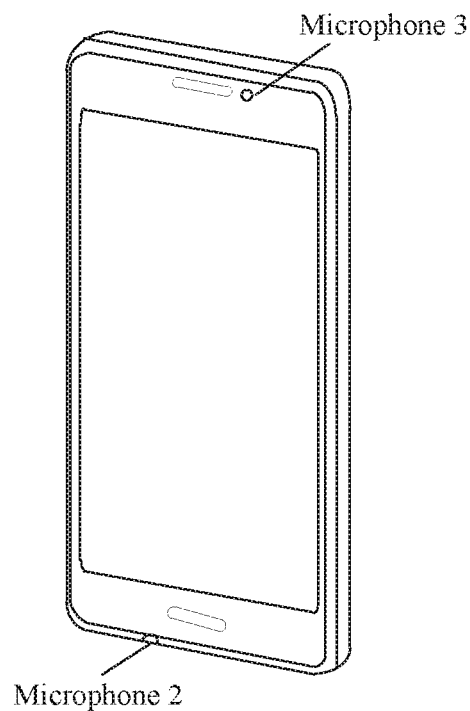
FIG. 6b is a schematic diagram of another microphone location according to an embodiment of this application.

In addition, on a basis of being provided with the microphone 1, referring to FIG. 6*b*, the terminal may be further provided with a microphone 2. In the hands-free scene, the microphone 2 may be adjusted, to turn off the microphone 2, or may be adjusted, to turn on the microphone 2 to collect audio data. This is not specifically limited herein. Further, the terminal may be further provided with another microphone, for example, a microphone 3 shown in FIG. 6*b*. In addition to the first microphone, other microphones configured for the terminal may collect audio data, to assist the terminal in performing noise reduction processing.

Figure 7:
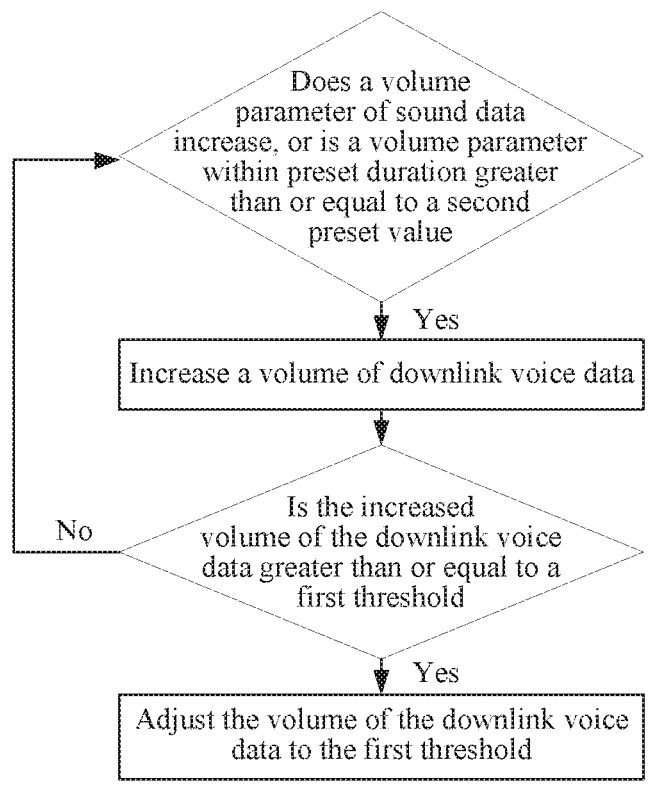
FIG. 7 is a flowchart of another volume adjustment method according to an embodiment of this application.

In a possible implementation, referring to FIG. 7, that the terminal adjusts the volume of the downlink voice data based on a volume parameter of the sound data in step 2020 may include the following steps 301 to 303.

301. If the volume parameter of the sound data increases, or if the volume parameter of the sound data within preset duration is greater than or equal to a second preset value, the terminal increases the volume of the downlink voice data.

When the volume parameter of the sound data increases, that is, a volume of the sound data increases, the terminal may adaptively increase the volume of the downlink voice data. The volume of the downlink voice data may be specifically a volume level, decibels (for example, 80 dB), or another form. This is not specifically limited herein.

In a possible implementation, that the volume parameter of the sound data increases may include: The volume parameter of the sound data is in a trend of increasing within current preset duration. When the volume parameter of the sound data is in the trend of increasing, the volume of the sound data is also in the trend of increasing. The current preset duration herein may be k (positive integer) effective adjacent unit times before a current moment. During a voice conversation, a user usually does not adjust a speech at every moment. That is, sometimes the terminal may detect sound data, and sometimes the terminal cannot detect sound data. A unit time within which sound data can be detected may be referred to as an effective unit time. For example, when the unit time is 1 s, the preset duration may include five effective unit times. That is, the preset duration may be 5 s, and the current preset duration may be five effective unit times before the current moment.

That the volume parameter of the sound data is in the trend of increasing means that a direction of change in the volume parameter is mainly increasing, and the volume parameter may strictly increase over time, or may not strictly increase over time. For example, referring to FIG. 8, if the current moment is a moment 2, the current preset duration is five effective unit times included before the moment 2, that is, five rectangles filled with oblique lines shown in FIG. 8, that is, effective unit times A, C, D, E, and F. Referring to an energy value curve 1 in FIG. 8, the five effective unit times respectively correspond to energy values 2.5, 3, 4, 5, and 6. The energy values respectively corresponding to the five effective unit times are strictly in ascending order. The energy values respectively corresponding to the five effective unit time periods are in the trend of increasing. Referring to an energy value curve 2 in FIG. 8, the five effective unit times respectively correspond to energy values 3, 4, 3.5, 5, and 6. Although an energy value 3.5 within a second effective unit time is less than an energy value 4 within a previous effective unit time, it can be learned from the energy value curves in FIG. 8 that the energy values respectively corresponding to the five effective unit time periods are still in the trend of increasing.

In another possible implementation, that the volume parameter of the sound data increases may include: A difference between a first average value corresponding to the volume parameter of the sound data within the current preset duration and a second average value corresponding to a volume parameter of sound data within previous preset duration is greater than a seventh preset value. For example, when the volume parameter is the average volume value, the seventh preset value may be 5 dB.

In another possible implementation, that the volume parameter of the sound data increases may include: A first average value corresponding to the volume parameter of the sound data within the current preset duration is greater than a second average value corresponding to a volume parameter of sound data within previous preset duration.

In another possible implementation, a difference between a volume parameter of sound data within a current effective unit time and a volume parameter of sound data within a previous effective unit time is greater than an eighth preset value. For example, when the volume parameter is the average volume value, the eighth preset value may be 5 dB.

In another possible implementation, a volume parameter of sound data within a current effective unit time is greater than a volume parameter of sound data within a previous effective unit time.

That the volume parameter of the sound data within preset duration is greater than or equal to a second preset value in step 301 means that the volume parameter of the sound data remains greater than or equal to a particular preset value within the preset duration. Still using the case shown in FIG. 8 as an example, if the second preset value is 3.5, the energy values respectively corresponding to the five effective unit times included in the current preset duration are each greater than or equal to the second preset value. That is, the energy value of the sound data remains greater than or equal to 3.5 within the current preset duration.

Figure 8:
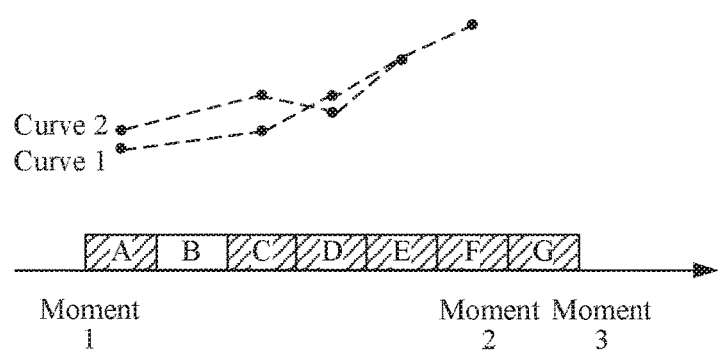
FIG. 8 is a schematic diagram of an energy value of sound data according to an embodiment of this application.

In addition, referring to FIG. 8, if the current moment is a moment 3, the current preset duration includes effective unit times C, D, E, F, and G.

During an actual voice conversation, a user usually proactively increases a speaking volume when the user cannot hear clearly because the downlink voice data is not clear or the volume of the downlink voice data is relatively low. Based on such a use feature of the user, when the user proactively increases the speaking volume or the user continues to speak loudly, the volume of the downlink voice data may be relatively low. In this case, the terminal may automatically increase the volume of the downlink voice data.

In this embodiment of this application, the volume parameter of the sound data may indicate the volume value of the sound data. When the volume parameter of the sound data increases, it may indicate that the volume of the sound data also increases, and the user may increase the speaking volume. When the volume parameter of the sound data remains greater than or equal to the second preset value within the current preset duration, it may indicate that the user continues to speak loudly. In this case, the volume of the downlink voice data may be relatively low, and the volume of the downlink voice data may be adaptively increased, thereby improving user experience.

In addition, if a condition in step 301 is not met, the terminal may maintain a current volume of the downlink voice data unchanged.

302. If the increased volume of the downlink voice data is greater than or equal to a first threshold, the terminal adjusts the volume of the downlink voice data to the first threshold.

The first threshold may be a maximum volume threshold to which the downlink voice data can be adjusted. The first threshold may be set based on an actual situation, and specifically, may be set to a relatively large value when it is ensured that no speech distortion exists. The first threshold may be specifically a volume level, decibels (for example, 80 dB), or another form. This is not specifically limited herein.

After adaptively increasing the volume of the downlink voice data to the first threshold, that is, the maximum volume threshold, based on the volume parameter of the sound data, the terminal may stop adjusting the volume of the downlink voice data adaptively based on the sound data. In this way, the volume of the downlink voice data is adjusted to the maximum volume threshold.

303. If the increased volume of the downlink voice data is less than the first threshold, the terminal further determines whether the volume parameter of the sound data increases, or whether the volume parameter of the sound data within the preset duration is greater than or equal to the second preset value.

When the increased volume of the downlink voice data is less than the maximum volume threshold, the terminal may further determine, by using step 301 in a subsequent process, whether the volume parameter of the sound data increases, or whether the volume parameter of the sound data within the preset duration is greater than or equal to the second preset value, thereby further adaptively adjusting the volume of the downlink voice data based on the volume parameter of the sound data.

Figure 9:
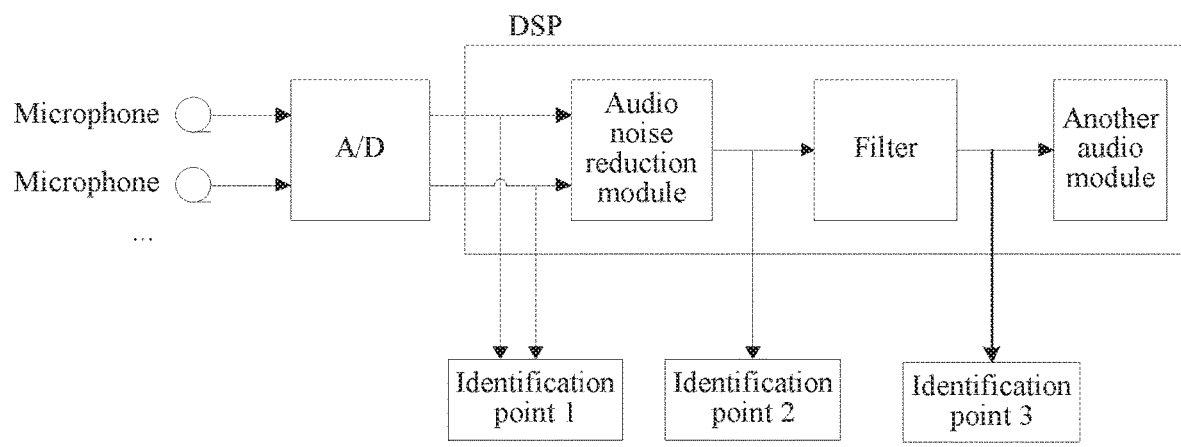
FIG. 9 is a schematic flowchart for processing sound data according to an embodiment of this application.

It should be noted that the sound data herein is data collect by the first microphone, is uplink voice data before noise reduction, that is, data at an identification point 1 shown in FIG. 9, and is relatively direct voice data collected by the microphone. The data is rich in content, and relatively much content can be detected.

In another possible implementation, that the terminal adjusts the volume of the downlink voice data based on a volume parameter of the sound data in step 2020 may include the following steps.

401. The terminal obtains the uplink voice data in the sound data.

The uplink voice data herein may be data obtained after noise reduction is performed on the sound data collected by the first microphone, that is, data at an identification point 2 shown in FIG. 9. Compared with the uplink voice data before the noise reduction, the uplink voice data on which a noise reduction algorithm processing is performed can more accurately indicate an actual volume value of uplink voice data input by the user because noise is reduced.

Further, the uplink voice data herein may be alternatively data obtained after noise reduction and filtering processing, that is, data at an identification point 3 shown in FIG. 9. Because voice data of a person during speaking usually falls within a relatively fixed frequency range (for example, 0 Hz to 8000 Hz), the terminal may perform filtering processing based on this frequency range, thereby maintaining the voice data within the frequency range, that is, maintaining the voice data of the person during speaking. In this case, the voice data can more accurately indicate the uplink voice data, so that the volume of the downlink voice data can be more accurately adjusted based on the volume value of the uplink voice data.

402. The terminal adjusts the volume of the downlink voice data based on a volume parameter of the uplink voice data.

Figure 10:
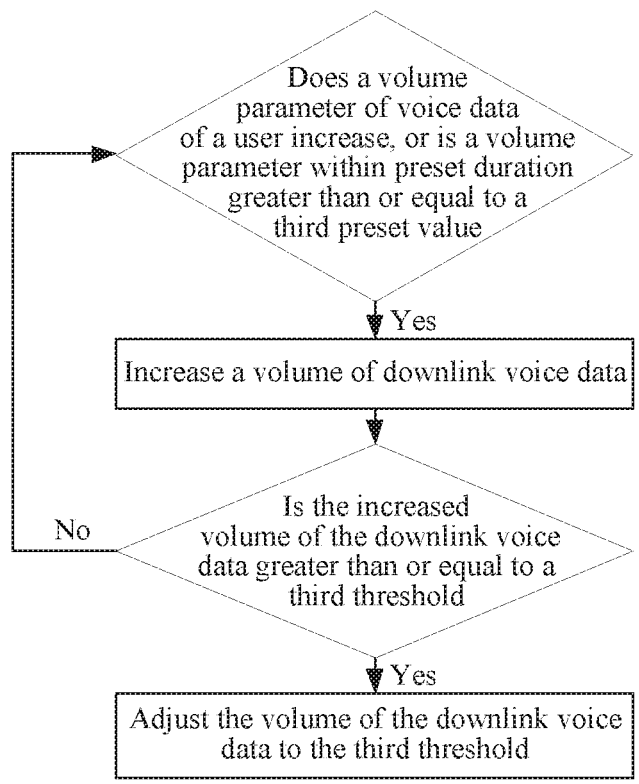
FIG. 10 is a flowchart of another volume adjustment method according to an embodiment of this application.

Referring to FIG. 10, that the terminal adjusts the volume of the downlink voice data based on a volume parameter of the uplink voice data in step 402 may include the following steps.

501. If the volume parameter of the uplink voice data increases, or if the volume parameter of the uplink voice data within the preset duration is greater than or equal to a third preset value, the terminal increases the volume of the downlink voice data.

The volume parameter of the uplink voice data is used to describe the volume value of the uplink voice data. For example, the volume parameter of the uplink voice data may be an energy value, a power value, or an average volume value of the uplink voice data within a unit time. A larger volume parameter of the uplink voice data may indicate a higher volume of the uplink voice data.

The method for determining, by the terminal, whether the volume parameter of the uplink voice data increases in step 501 is similar to the method for determining, by the terminal, whether the volume parameter of the sound data increases in step 301. For details, refer to related descriptions above. The details are not described herein again. Similarly, the method for determining, by the terminal, whether the volume parameter of the uplink voice data within the preset duration is greater than or equal to a third preset value in step 501 is similar to the method for determining, by the terminal, whether the volume parameter of the uplink voice data within the preset duration is greater than or equal to a third preset value in step 301. For details, refer to related descriptions above. The details are not described herein again.

If the volume parameter of the uplink voice data increases, it may indicate that the volume of the uplink voice data also increases, and the user continues to increase the speaking volume. If the volume parameter of the uplink voice data within the current preset duration remains greater than or equal to the third preset value, it may indicate that the user continues to speak loudly. In this case, the user may increase the speaking volume because the user cannot hear downlink voice clearly. Therefore, the volume of the downlink voice data may be adaptively increased in this case, thereby improving user experience.

In addition, if a condition in step 501 is not met, the terminal may maintain a current volume of the downlink voice data unchanged.

502. If the increased volume of the downlink voice data is greater than or equal to a third threshold, the terminal adjusts the volume of the downlink voice data to the third threshold.

The third threshold may be a maximum volume threshold to which the downlink voice data can be adjusted. The third threshold may be the same as or may be different from the first threshold or a second threshold. After adaptively increasing the volume of the downlink voice data to the third threshold, that is, the maximum volume threshold, based on the volume parameter of the uplink voice data, the terminal may stop adjusting the volume of the downlink voice data adaptively based on the uplink voice data. In this way, the volume of the downlink voice data is adjusted to the maximum volume threshold.

503. If the increased volume of the downlink voice data is less than the third threshold, the terminal further determines whether the volume parameter of the uplink voice data increases, or whether the volume parameter of the uplink voice data within the preset duration is greater than or equal to the third preset value.

When the increased volume of the downlink voice data is less than the maximum volume threshold, the terminal may further determine, by using step 501 in a subsequent process, whether the volume parameter of the uplink voice data increases, or whether the volume parameter of the uplink voice data within the preset duration is greater than or equal to the third preset value, thereby further adaptively adjusting the volume of the downlink voice data based on the volume parameter of the uplink voice data.

Figure 11:
FIG. 11 is a schematic diagram of a handheld scene according to an embodiment of this application.

A hand-held scene:

In the hand-held scene shown in FIG. 11, the user receives and listens to downlink voice data by using the receiver during a voice conversation.

In an implementation, the terminal is provided with a second microphone and a third microphone. That the terminal collects sound data in step 201 may include: The terminal collects the sound data by using the second microphone.

The sound data herein is mixed data of the uplink voice data and the background noise.

The method may further include: The terminal collects the background noise by using the third microphone.

For example, referring to FIG. 6a, the microphone 1 may be the third microphone, and may be configured to mainly collect the background noise. Referring to FIG. 6b, the microphone 2 may be the second microphone, and may be configured to mainly collect the sound data. Other microphones may be turned off or turned on. When turned on, other microphones may assist the terminal in performing noise reduction processing.

In the hand-held scene shown in FIG. 11, the terminal may determine, based on magnitude of the background noise, whether the scene is specifically in a noisy environment scene or a normal environment scene currently, so that the terminal adaptively adjusts the volume of the downlink voice data based on a specific scene by using a corresponding adjustment policy.

Figure 12:
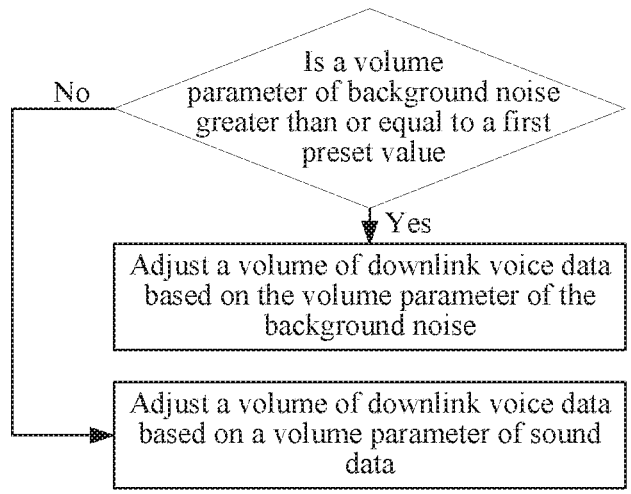
FIG. 12 is a flowchart of another volume adjustment method according to an embodiment of this application.

Referring to FIG. 12, in the hand-held scene shown in FIG. 11, that the terminal adjusts the volume of the downlink voice data based on a volume parameter of the sound data in step 2020 may include the following steps.

601. The terminal determines whether a volume parameter of the background noise is greater than or equal to a first preset value.

The first preset value may be set based on an actual requirement. For example, when the volume parameter is an average volume value, the first preset value may be 50 dB.

602. If the volume parameter of the background noise is greater than or equal to the first preset value, the terminal adjusts the volume of the downlink voice data based on the volume parameter of the background noise.

When the volume parameter of the background noise is greater than or equal to the first preset value, the terminal may consider that the terminal is in a noisy environment scene currently. In the specific noisy environment scene, the terminal may adjust the volume of the downlink voice data based on the volume parameter of the background noise.

603. If the volume parameter of the background noise is less than the first preset value, the terminal adjusts the volume of the downlink voice data based on the volume parameter of the sound data.

When the volume parameter of the background noise is less than the first preset value, the terminal may consider that the terminal is in a normal environment scene currently. In the specific normal environment scene, the terminal may adjust the volume of the downlink voice data based on the volume parameter of the sound data.

Figure 13:
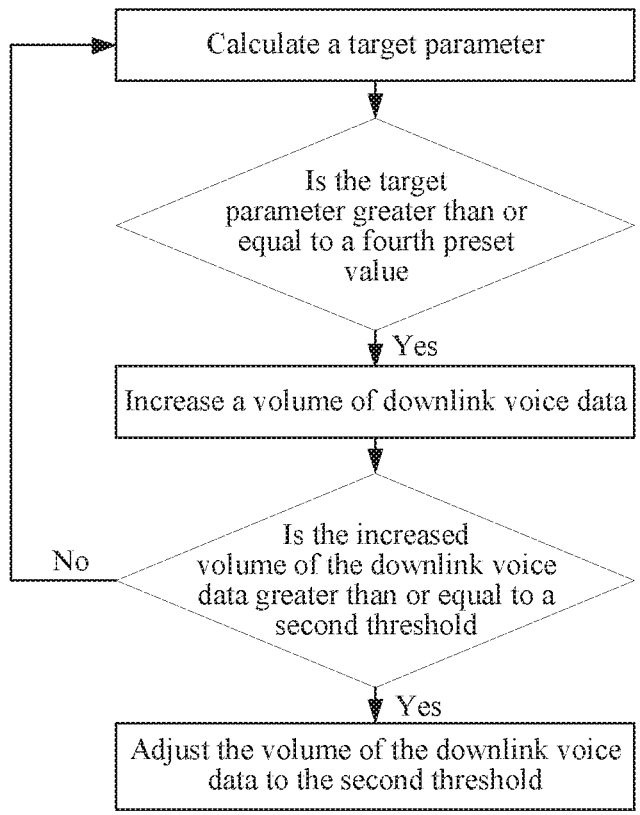
FIG. 13 is a flowchart of another volume adjustment method according to an embodiment of this application.

In the specific noisy environment scene, referring to FIG. 13, that the terminal adjusts the volume of the downlink voice data based on the volume parameter of the background noise in step 602 may include the following steps.

701. The terminal calculates a target parameter, where the target parameter includes a difference between the volume parameter of the background noise and a volume parameter of the downlink voice data or a ratio of the volume parameter of the background noise to a volume parameter of the downlink voice data.

The volume parameter of the background noise is used to indicate volume value of the background noise. For example, the volume parameter of the background noise may be an energy value, a power value, or an average volume value of the background noise within a unit time. The volume parameter of the downlink voice data is used to indicate volume value of the downlink voice data. For example, the volume parameter of the downlink voice data may be an energy value, a power value, or an average volume value of the downlink voice data within a unit time.

The difference or the ratio herein is a difference or a ratio between same volume parameters respectively corresponding to the background noise and the downlink voice data, for example, a difference between an energy value of the background noise within a unit time and an energy value of downlink voice data within a unit time; for another example, a ratio of an average volume value of the background noise within a unit time to an average volume value of the downlink voice data within a unit time.

702. If the target parameter is greater than or equal to a fourth preset value, the terminal increases the volume of the downlink voice data.

A setting of the fourth preset value is related to whether the target parameter is specifically a difference or a ratio. Specifically, when the target parameter is a difference, the fourth preset value may be 0 or a value close to 0. When the target parameter is a ratio, the fourth preset value may be 1 or a value close to 1. In addition, the fourth preset value is also related to the volume parameter. The fourth preset value varies with the volume parameter.

When the target parameter is greater than or equal to the fourth preset value, the difference between the volume parameter of the background noise and the volume parameter of the downlink voice data or the ratio of the volume parameter of the background noise to the volume parameter of the downlink voice data is greater than or equal to the fourth preset value. In this case, it may indicate that the volume of the background noise is greater than the volume of the downlink voice data, or a difference between the volume of the background noise and the volume of the downlink voice data is not large, a background environment is relatively noisy, and magnitude of the background noise is relatively large. Consequently, the user may not hear the downlink voice data clearly. Therefore, the volume of the downlink voice data needs to be increased.

In addition, if the target parameter is less than the fourth preset value, it may indicate that a difference between the volume of the background noise and the volume of the downlink voice data is relatively large, and the terminal may maintain a current volume of the downlink voice data unchanged.

703. If the increased volume of the downlink voice data is greater than or equal to a second threshold, the terminal adjusts the volume of the downlink voice data to the second threshold.

The second threshold may be a maximum volume threshold to which the downlink voice data can be adjusted. The second threshold may be the same as or may be different from the first threshold. After adaptively increasing the volume of the downlink voice data to the second threshold, that is, the maximum volume threshold, based on the volume parameter of the background noise in sound data, the terminal may stop adjusting the volume of the downlink voice data adaptively based on the background noise. In this way, the volume of the downlink voice data is adjusted to the maximum volume threshold.

704. If the increased volume of the downlink voice data is less than the second threshold, the terminal further determines whether the target parameter is greater than or equal to the fourth preset value.

When the increased volume of the downlink voice data is less than the maximum volume threshold, the terminal may further calculate and determine, by using steps 701 and 702 in a subsequent process, whether the foregoing target parameter is greater than or equal to the fourth preset value, thereby further adaptively adjusting the volume of the downlink voice data based on the volume parameter of the sound data.

In the specific noisy environment scene, when the target parameter is less than the fourth preset value, in another possible implementation, the method may further include: when the volume parameter of the background noise decreases, the terminal decreases the volume of the downlink voice data.

In this case, when the volume parameter of the background noise decreases, it may indicate that the background noise in the noisy environment decreases. Therefore, the volume of the downlink voice data may be decreased to avoid poor user experience caused by an extremely high volume of the downlink voice data.

In a possible implementation, that the volume parameter of the sound data decreases may include: The sound data is in a trend of decreasing within the current preset duration.

In another possible implementation, that the volume parameter of the sound data decreases may include: A first average value corresponding to the volume parameter of the sound data within the current preset duration is less than a second average value corresponding to a volume parameter of sound data within previous preset duration.

In another possible implementation, a volume parameter of sound data within a current effective unit time is less than a volume parameter of sound data within a previous effective unit time.

Particularly, in another possible implementation, that the volume parameter of the background noise decreases may include: A decreased value of the volume parameter of the background noise is greater than or equal to a fifth preset value. The decreased value herein may be a decreased value between the volume parameters respectively corresponding to the current preset duration and the previous preset duration, or may be a decreased value between the volume parameters respectively corresponding to the current effective unit time and the previous effective unit time. In this case, it may indicate that the volume of the background noise decreases relatively greatly, and the terminal may be moved from a relatively noisy environment to a relatively quiet environment (for example, out of KTV). Because the volume of the downlink voice data is usually relatively high in the noisy environment before the background noise decreases, the volume of the downlink voice data may be correspondingly decreased after the background noise decreases, to avoid poor user experience caused by an extremely high volume of the downlink voice data. For example, when the volume parameter is an average volume value, the fifth preset value may be 5 dB.

In the specific normal environment scene, in a possible implementation, for the adjusting, by the terminal, the volume of the downlink voice data based on the volume parameter of the sound data in step 603, refer to the descriptions in the foregoing steps 301 to 303. Details are not described herein again. It should be noted that the sound data herein is data collected by the second microphone, may be considered as uplink voice data before noise reduction, that is, data at an identification point 1 shown in FIG. 9, and is relatively direct voice data collected by the microphone. The data is rich in content, and relatively much content can be detected.

In the specific normal environment scene, in another possible implementation, that the terminal adjusts the volume of the downlink voice data based on the volume parameter of the sound data in step 603 may include the foregoing step 401 and step 402, and the method for adjusting the volume of the downlink voice data based on the volume parameter of the uplink voice data in the sound data described in step 501 to step 503. Details are not described herein again. The uplink voice data herein may be data obtained after noise reduction is performed on the sound data collected by the second microphone, that is, data at an identification point 2 shown in FIG. 9. For example, the terminal may perform noise reduction based on mixed data of the uplink voice data collected by the second microphone and the background noise, and the background noise collected by the third microphone, to obtain the uplink voice data. Certainly, the uplink voice data herein may be alternatively data obtained after noise reduction and filtering processing, that is, data at an identification point 3 shown in FIG. 9, so that the volume of the downlink voice data can be more accurately adjusted based on the volume value of the uplink voice data.

Figure 14:
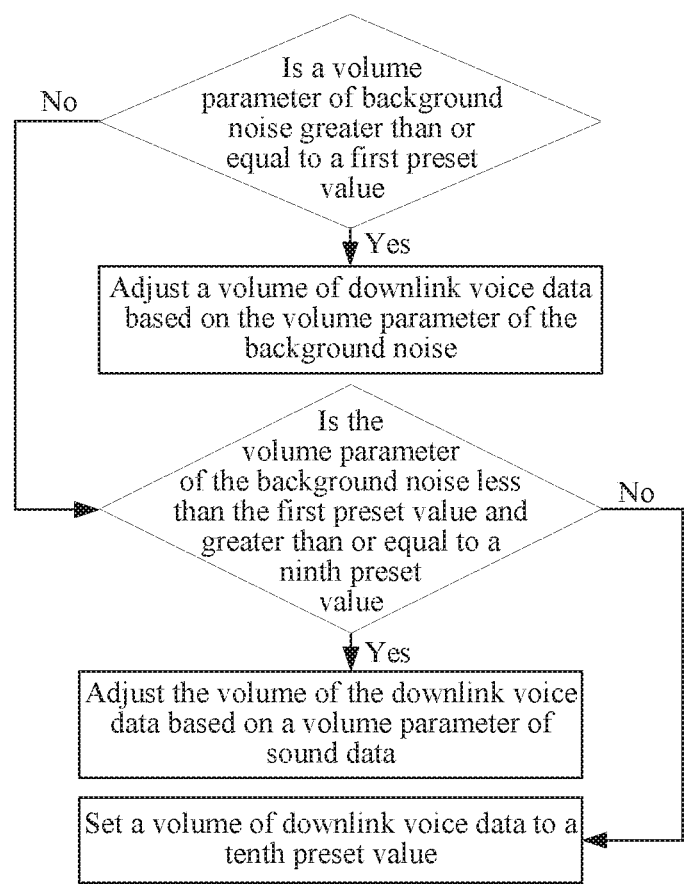
FIG. 14 is a flowchart of another volume adjustment method according to an embodiment of this application.

In addition, referring to FIG. 14, in the hand-held scene shown in FIG. 11, that the terminal adjusts the volume of the downlink voice data based on a volume parameter of the sound data in step 2020 may include the following steps.

801. The terminal determines whether a volume parameter of the background noise is greater than or equal to a first preset value.

802. If the volume parameter of the background noise is greater than or equal to the first preset value, the terminal adjusts the volume of the downlink voice data based on the volume parameter of the background noise.

When the volume parameter of the background noise is greater than or equal to the first preset value, the terminal may consider that the terminal is in a noisy environment scene currently. In the specific noisy environment scene, the terminal may adjust the volume of the downlink voice data based on the volume parameter of the background noise.

803. If the volume parameter of the background noise is less than the first preset value and is greater than or equal to a ninth preset value, the terminal adjusts the volume of the downlink voice data based on the volume parameter of the sound data.

The ninth preset value is less than the first preset value, and the ninth preset value is relatively small. For example, when the volume parameter is an average volume value, the ninth preset value may be 20 dB.

804. If the volume parameter of the background noise is less than the ninth preset value, the terminal sets the volume of the downlink voice data to a tenth preset value.

An implementation process of the steps 801 to 803 is similar to that of the foregoing steps 501 to 503. Details are not described herein again. In step 804, if the volume parameter of the background noise is less than the ninth preset value, it may indicate that a current background environment is relatively quiet (for example, currently in a nursery). Therefore, the volume of the downlink voice data may be set to a preset value that is relatively small (that is, the tenth preset value), to avoid poor user experience caused by an extremely high volume of the downlink voice data. For example, when the volume parameter is an average volume value, the tenth preset value may be 30 dB.

Further, in the volume adjustment method provided in the embodiments of this application, a fourth threshold and a sixth preset value may be further configured for the terminal. The fourth threshold is a maximum volume threshold to which the downlink voice data can be adjusted, and specifically, may be the first threshold, the second threshold, or the third threshold in the foregoing different scenes. The sixth preset value may be set based on an actual requirement, and usually, may be set to a relatively small value.

That the terminal adjusts a volume of the downlink voice data based on the sound data may include: When a difference between the fourth threshold and the volume of the downlink voice data is greater than or equal to the sixth preset value, the terminal adjusts the volume of the downlink voice data based on the sound data by using a first step size. When the difference between the fourth threshold and the volume of the downlink voice data is less than the sixth preset value, the terminal adjusts the volume of the downlink voice data based on the sound data by using a second step size. The second step size is less than the first step size.

When the difference between the fourth threshold and the volume of the downlink voice data is less than the sixth preset value, the volume of the downlink voice data is close to a maximum adjustable volume threshold. A higher volume indicates a closer approach of audio parts to a saturation region and easier voice data distortion. Therefore, when the difference between the fourth threshold and the volume of the downlink voice data is less than the sixth preset value, a step size for adjusting a volume may be reduced, so that downlink speech distortion caused by an approach of audio parts to a saturation region is avoided as much as possible while an effect of adjusting the volume of the downlink voice data is achieved.

For example, if the fourth threshold, that is, the maximum volume threshold to which the downlink voice data can be adjusted is 80 dB, and the sixth preset value is 20 dB, when the volume of the downlink voice data is less than 60 dB, the terminal may perform, when increasing the volume of the downlink voice data, an adjustment by using 10 dB as a step size, that is, the terminal increases the volume of the downlink voice data by 10 dB each time. When the volume of the downlink voice data is greater than or equal to 60 dB, the terminal may perform an adjustment by using 5 dB as a step size, that is, the terminal increases the volume of the downlink voice data by 5 dB each time.

In a specific implementation, 80 dB may correspond to 10 volume levels. Each time the terminal adaptively increases the volume of the downlink voice data, the terminal may increase the volume of the downlink voice data by one volume level. Referring to the following Table 1, before 60 dB (80 dB-20 dB), every 10 dB may correspond to one volume level, and from 60 dB to 80 dB, every 5 more dB may correspond to one volume level.

TABLE 1

| Volume level | dB value |
|---|---|
| Level 1 | 10 dB |
| Level 2 | 20 dB |
| Level 3 | 30 dB |
| Level 4 | 40 dB |
| Level 5 | 50 dB |
| Level 6 | 60 dB |
| Level 7 | 65 dB |
| Level 8 | 70 dB |
| Level 9 | 75 dB |
| Level 10 | 80 dB |

Further, in the embodiments of this application, after the terminal adaptively adjusts the volume of the downlink voice data, the following step may be further included.

203. The terminal triggers prompt information, where the prompt information includes a visual cue and/or an auditory cue, and the prompt information is used to prompt an adjustment already made to the volume of the downlink voice data.

After adaptively adjusting the volume of the downlink voice data, the terminal may further trigger the prompt information, to remind the user in a timely manner that the volume of the downlink voice data has been adaptively adjusted, thereby improving use experience of the user. The prompt information may include a visual cue and/or an auditory cue, or another type of prompt information. This is not specifically limited herein.

Figure 15A:
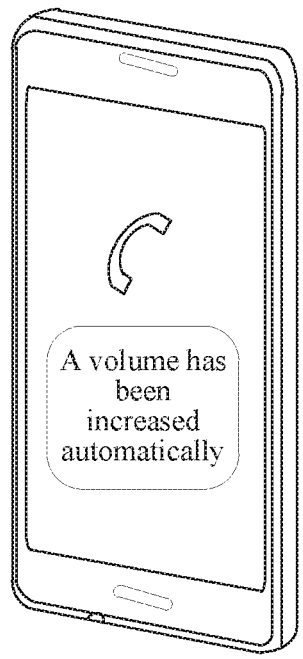
FIG. 15a is a schematic diagram of a prompting mode according to an embodiment of this application.
Figure 15B:
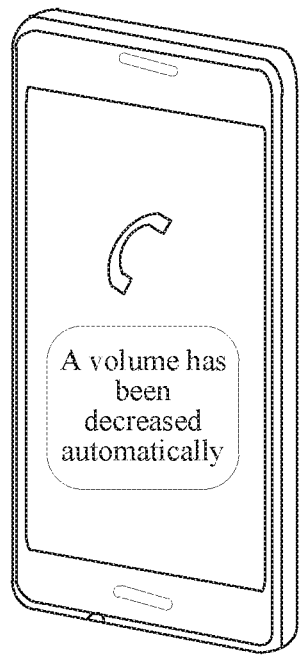
FIG. 15b is a schematic diagram of another prompting mode according to an embodiment of this application.
Figure 15C:
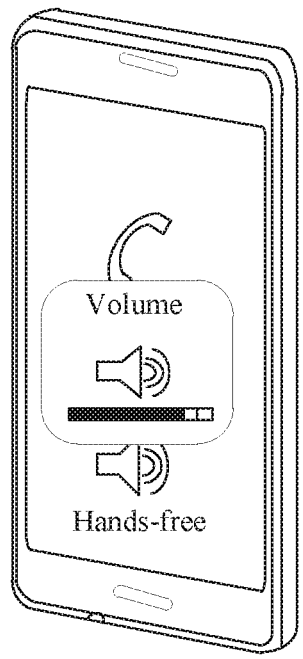
FIG. 15c is a schematic diagram of another prompting mode according to an embodiment of this application.
Figure 15D:
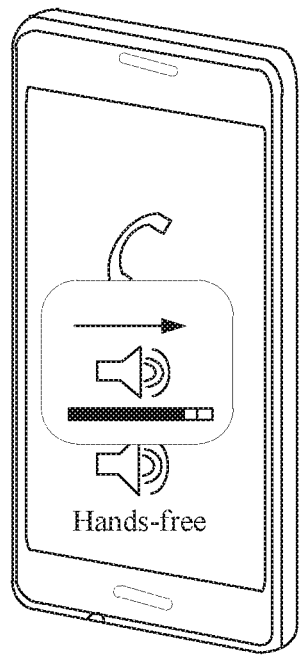
FIG. 15d is a schematic diagram of another prompting mode according to an embodiment of this application.
Figure 15E:
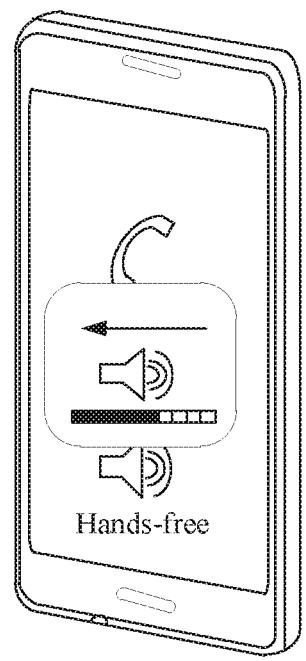
FIG. 15e is a schematic diagram of another prompting mode according to an embodiment of this application.

For example, referring to FIG. 15*a*, the terminal may display visual cue information "the volume has been increased automatically" on the display screen after adaptively increasing the volume of the downlink voice data. Referring to FIG. 15b, the terminal may display prompt information "the volume has been decreased automatically" on the display screen after adaptively decreasing the volume of the downlink voice data. For example, the terminal may create a sound cue "tick" after adaptively increasing the volume of the downlink voice data, to notify the user that the volume has been increased automatically. Alternatively, the terminal may create a sound cue different from "tick" after adaptively increasing the volume of the downlink voice data, to notify the user that the volume has been increased automatically. For example, the terminal may create a sound cue "tick" after either adaptively increasing or decreasing the volume of the downlink voice data. However, a volume of "tick" corresponding to the increasing of the volume of the downlink voice data is relatively high, and a volume of "tick" corresponding to the decreasing of the volume of the downlink voice data is relatively low. For example, after adaptively increasing/decreasing the volume of the downlink voice data, the terminal simultaneously displays prompt information "the volume has been increased/decreased automatically" on the display screen and makes a sound "tick". For example, after adaptively increasing/decreasing the volume of the downlink voice data, the terminal may turn on the screen once, to notify the user that the volume of the downlink voice data has been adjusted automatically. For example, referring to FIG. 15c, after adaptively increasing/decreasing the volume of the downlink voice data, the terminal may further display a value of the increased/decreased volume level when turning on the screen, to notify the user that the volume of the downlink voice data has been adjusted automatically. For example, referring to FIG. 15d, after adaptively increasing the volume of the downlink voice data, the terminal may further display an arrow pointing rightwards (or upwards) on a basis of displaying the adjusted volume, to notify the user that the volume of the downlink voice data has been increased automatically. For example, referring to FIG. 15e, after adaptively decreasing the volume of the downlink voice data, the terminal may further display an arrow pointing leftwards (or downwards) on a basis of displaying the adjusted volume, to notify the user that the volume of the downlink voice data has been increased automatically. For example, after adaptively increasing/decreasing the volume of the downlink voice data, the terminal may make an indicator flicker, to notify the user that the volume of the downlink voice data has been adjusted automatically. For example, after adaptively increasing/decreasing the volume of the downlink voice data, the terminal may notify, by means of vibrations, the user that the volume of the downlink voice data has been adjusted automatically. In addition, there may further be a plurality of other possible prompting modes, which are no longer described by examples one by one herein. Moreover, FIG. 15a to FIG. 15e are described by using the hands-free scene as an example. Step 203 may be further applied to another scene. This is no longer described one by one by using drawings.

Further, the method may further include the following step.

204. If the terminal detects indication information of a user, the terminal stops adjusting the volume of the downlink voice data, where the indication information is used to instruct to increase or decrease the volume of the downlink voice data.

In the process in which the terminal adaptively adjusts the volume of the downlink voice data based on the sound data or the uplink voice data in the sound data, if the terminal detects the indication information used by the user to proactively adjust the volume of the downlink voice data, the user may not intend to use the terminal to adaptively adjust the volume of the downlink voice data, or the user may consider that a proactive adjustment is faster, or the adjusted volume of the downlink voice data is more comfortable. In this case, the proactive adjustment made by the user prevails. The terminal may disable, during the current voice conversation, a function of adaptively adjusting the volume of the downlink voice data based on the sound data or the uplink voice data. During a next voice conversation, the terminal may resume the function of adaptively adjusting the volume of the downlink voice data based on the sound data or the uplink voice data.

It should be noted that if the terminal detects the indication information of the user, the terminal also stops adjusting the volume of the downlink voice data based on the background noise during the current voice conversation, where the indication information is used to instruct to increase or decrease the volume of the downlink voice data.

Still further, the method may further include the following step.

205. The terminal records an audio-related setting operation of the user, where the setting operation includes a volume setting and a voice conversation mode.

The terminal may learn a usage habit, a preferential setting, and the like of the user by recording the setting operation of the user, to learn, by means of statistics collection of big data, whether a current setting of a product volume parameter is proper, and learn a further requirement of the user on audio, thereby facilitating a further improvement on the volume setting or audio parts. For example, the terminal may record the voice conversation mode of the user, for example, a hands-free mode, a handheld mode, a headset mode, or a Bluetooth conversation mode. The terminal may further record volume value used by the user in different voice conversation modes respectively. If the user sets a volume of a terminal product to a maximum volume most of the time, it may indicate that a volume level setting of the terminal product is improper, and a value of the maximum volume needs to be increased. This may be adjusted in a subsequent version. For example, 1 to n levels may be increased on a basis of existing volume levels.

There is no specific sequential order between step 205 and steps 201 to 204, and step 205 may be before or after any one of steps 201 to 204. This is not specifically limited herein.

It can be learned that in the volume adjustment method provided in the embodiments of this application, for different scenes and specific usage statuses during the voice conversation, the volume of the downlink voice data can be adaptively adjusted in real time, thereby improving use experience of the user.

In addition, currently, a growing number of middle-aged and senior people also start to use adaptive mobile phones. Different from youngsters with characteristics of pursuing new things and a higher speed, the middle-aged and senior people have their own usage habits. In the audio field, most apparently, the middle-aged and senior people hope that a ringing volume and a volume during a call are high, but do not have a high requirement on sound quality. In the volume adjustment method provided in the embodiments of this application, a volume during a call can be adaptively increased, so that usage experience of the middle-aged and senior people can be greatly improved.

It should be noted that in the embodiments of this application, the second preset value, the first preset value, . . . to the tenth preset value, and the first threshold, the second threshold, . . . to the fourth threshold may be specifically set based on an actual requirement.

It may be understood that to implement the foregoing functions, the terminal includes corresponding hardware structures and/or software modules for implementing the functions. A person skilled in the art should be easily aware that this application can be implemented by hardware or in a form of a combination of hardware and computer software with reference to algorithm steps of examples described in the embodiments disclosed in this specification. Whether a function is implemented by hardware or in a manner of computer software driving hardware depends on particular applications and design constraint conditions of the technical solutions. A person skilled in the art may use different methods to implement the described functions for each particular application, but it should not be considered that the implementation falls outside the scope of this application.

In this embodiment of this application, functional unit division may be performed for the terminal based on the foregoing method examples. For example, the functional unit division may be performed corresponding to the functions, or two or more functions may be integrated in one processing module. The integrated module may be implemented in a form of hardware, or may be implemented in a form of a software functional unit. It should be noted that module division in this embodiment of this application is an example and is merely logical function division. During actual implementation, there may be another division manner.

Figure 16:
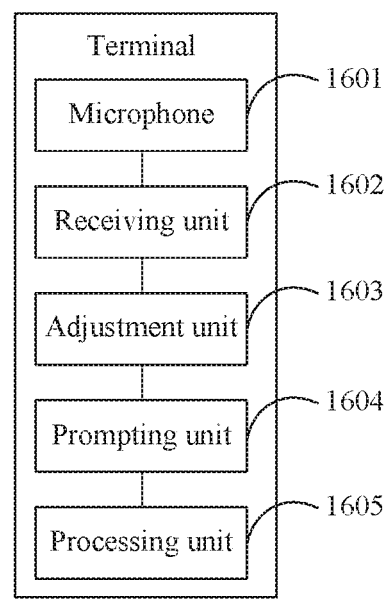
FIG. 16 is a schematic structural diagram of a terminal according to an embodiment of this application.

In a case in which the functional unit division is performed corresponding to the functions, FIG. 16 is a schematic diagram of a possible composition of the terminal used in the foregoing embodiments. As shown in FIG. 16, the terminal may include: at least one microphone 1601, a receiving unit 1602, an adjustment unit 1603, a prompting unit 1604, and a processing unit 1605.

The microphone 1601 is configured to support the terminal in collecting sound data or background noise. The receiving unit 1602 is configured to receive downlink voice data. The adjustment unit 1603 is configured to adjust, based on the sound data collected by the microphone 1601, a volume of the downlink voice data received by the receiving unit 1602. The adjustment unit 1603 is configured to support the terminal in performing step 202 in FIG. 3, and steps shown in FIG. 7, FIG. 10, FIG. 12, FIG. 13, or FIG. 14. The prompting unit 1604 is configured to support the terminal in performing step 203 above. The processing unit 1605 is configured to support the terminal in performing step 204 and step 205 above. The units may be further configured to support another process of a technology described herein. For all content related to the steps in the foregoing method embodiments, refer to functional descriptions of corresponding functional modules. Details are not described herein.

Further, the terminal in FIG. 16 is presented in a form of a functional unit. The "unit" herein may refer to an application-specific integrated circuit (application specific integrated circuit, ASIC), a circuit, a processor and a memory executing one or more software or firmware programs, an integrated logic circuit, and/or another device that may provide the foregoing functions. In a simple embodiment, a person skilled in the art may figure out that the terminal in FIG. 16 may be in a form shown in FIG. 17.

Figure 17:
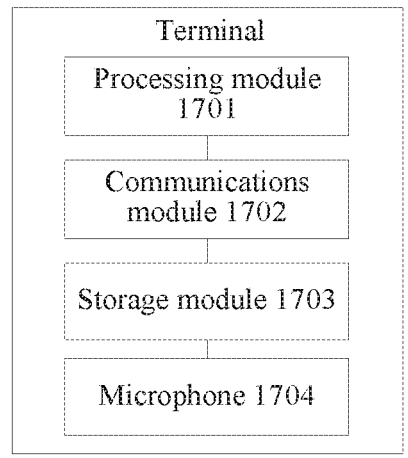
FIG. 17 is a schematic structural diagram of another terminal according to an embodiment of this application.

In a case in which an integrated unit is used, FIG. 17 is a schematic diagram of another possible composition of the terminal device used in the foregoing embodiments. As shown in FIG. 17, the terminal device includes: a processing module 1701, a communications module 1702, a storage module 1703, and a microphone 1704.

The microphone 1704 is configured to support the terminal device in performing step 201 in FIG. 3. The processing module 1701 is configured to control and manage an action of the terminal device. For example, the processing module 1701 is configured to support the terminal device in performing step 202 in FIG. 3, and steps in FIG. 7, FIG. 10, FIG. 12, FIG. 13, or FIG. 14, and/or applied to another process of a technology described herein. The communications module 1702 is configured to support communication between the terminal device and another network entity. The storage module 1703 is configured to store program code and data of the terminal device.

The processing module 1701 may be a processor or a controller. The controller/processor can implement or perform various examples of logic blocks, modules, and circuits described with reference to content disclosed in the present invention. Alternatively, the processor may be a combination for implementing a calculation function, for example, one or more microprocessor combinations, or a combination of microprocessors. The communications module 1702 may be a transceiver, a transceiver circuit, a communications interface, or the like. The storage module 1703 may be a memory.

The foregoing descriptions about implementations allow a person skilled in the art to understand that, for the purpose of convenient and brief description, division of the foregoing function modules is used as an example for description. During actual application, the foregoing functions can be allocated to different modules and implemented based on a requirement, that is, an inner structure of an apparatus is divided into different function modules to implement all or part of the functions described above.

Figure 18:
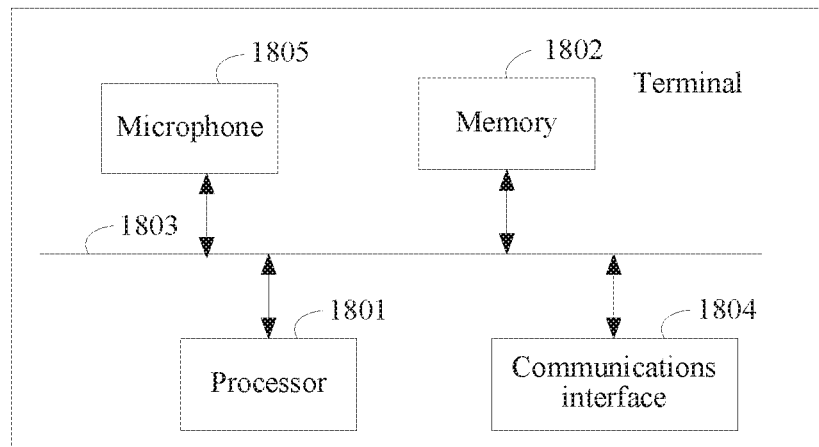
FIG. 18 is a schematic structural diagram of another terminal according to an embodiment of this application.

As shown in FIG. 18, FIG. 18 is a schematic structural diagram of another terminal according to an embodiment of the present invention. The terminal may include: a processor 1801, a memory 1802, a bus 1803, a communications interface 1804, and a microphone 1805. The processor 1801, the memory 1802, and the communications interface 1804 are connected by using the bus 1803. The microphone 1805 is configured to collect sound data during a voice conversation. The memory 1802 is configured to store a computer executable instruction. When the terminal operates, the processor 1801 executes the computer executable instruction stored in the memory 1802, so that the terminal performs the volume adjustment method provided in the embodiments of the present invention. For the specific volume adjustment method, refer to related descriptions below or related descriptions in the accompanying drawings. Details are not described herein.

An embodiment of this application further provides a computer storage medium. The storage medium may be the foregoing storage module 1802.

An embodiment of this application further provides a computer program product including an instruction. When the computer program product runs on a computer, the computer may perform the volume adjustment method performed by the foregoing terminal.

All or some of the foregoing embodiments may be implemented by means of software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, a DVD), a semiconductor medium (for example, a solid state disk (solid state disk. SSD)), or the like.

Although this application is described with reference to the embodiments, in a process of implementing this application that claims protection, persons skilled in the art may understand and implement another variation of the disclosed embodiments by viewing the accompanying drawings, disclosed content, and the accompanying claims. In the claims, "comprising" (comprising) does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, obviously, various modifications and combinations may be made to them without departing from the spirit and scope of this application. Correspondingly, the specification and accompanying drawings are merely exemplary description of this application defined by the accompanying claims, and considered as any of or all modifications, variations, combinations or equivalents that cover the scope of this application. Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A volume adjustment method implemented by a terminal, wherein the volume adjustment method comprises:
   collecting sound data during a voice conversation, wherein the sound data comprises uplink voice data and background noise data;
   determining whether a volume parameter of the background noise is greater than or equal to a first preset value;
   adjusting the volume of the downlink voice data based on the volume parameter of the background noise in response to determining that the volume parameter of the background noise is greater than or equal to the first preset value; and
   adjusting the volume of the downlink voice data based on a volume parameter of the sound data in response to determining that the volume parameter of the background noise is less than the first preset value.

2. The volume adjustment method of claim 1, wherein adjusting the volume of the downlink voice data comprises adjusting the volume of the downlink voice data based on a volume parameter of the sound data, and wherein the volume parameter describes a volume value of the sound data.

3. The volume adjustment method of claim 2, wherein the volume parameter comprises at least one of an energy value, a power value, or an average volume value of the sound data.

4. The volume adjustment method of claim 2, wherein adjusting the volume of the downlink voice data comprises:
   determining that the volume parameter of the sound data increases or that the volume parameter of the sound data within a preset duration is greater than or equal to a second preset value;
   increasing the volume of the downlink voice data in response to the determining that the volume parameter of the sound data increases or that the volume parameter of the sound data within the preset duration is greater than or equal to the second preset value;
   determining an increased volume of the downlink voice data;
   adjusting the increased volume of the downlink voice data to a first threshold in response to the determining that the increased volume of the downlink voice data is greater than or equal to the first threshold; and
   determining whether the volume parameter of the sound data increases or whether the volume parameter of the sound data within the preset duration is greater than or equal to the second preset value in response to the determining that the increased volume of the downlink voice data is less than the first threshold.

5. The volume adjustment method of claim 2, wherein adjusting the volume of the downlink voice data comprises:
   obtaining the uplink voice data in the sound data; and
   adjusting the volume of the downlink voice data based on a volume parameter of the uplink voice data.

6. The volume adjustment method of claim 5, wherein adjusting the volume of the downlink voice data comprises:
   determining that the volume parameter of the uplink voice data increases or that the volume parameter of the uplink voice data within a preset unit time is greater than or equal to a third preset value;
   increasing the volume of the downlink voice data in response to the determining that the volume parameter of the uplink voice data increases or that the volume parameter of the uplink voice data within the preset unit time is greater than or equal to the third preset value;
   determining an increased volume of the downlink voice data;
   adjusting the increased volume of the downlink voice data to a third threshold in response to the determining that the increased volume of the downlink voice data is greater than or equal to the third threshold; and
   determining whether the volume parameter of the uplink voice data increases or whether the volume parameter of the uplink voice data within the preset unit time is greater than or equal to the third preset value in response to the determining that the increased volume of the downlink voice data is less than the third threshold.

7. The volume adjustment method of claim 1, wherein collecting the sound data comprises collecting the sound data using a first microphone.

8. The volume adjustment method of claim 1, wherein collecting the sound data comprises:
collecting the sound data using a second microphone; and
collecting the background noise using a third microphone.

9. The volume adjustment method of claim 1, wherein adjusting the volume of the downlink voice data comprises:
calculating a target parameter, wherein the target parameter comprises a difference between the volume parameter of the background noise and a volume parameter of the downlink voice data or a ratio of the volume parameter of the background noise to the volume parameter of the downlink voice data;
determining that the target parameter is greater than or equal to a fourth preset value;
increasing the volume of the downlink voice data in response to the determining that the target parameter is greater than or equal to the fourth preset value;
determining an increased volume of the downlink voice data;
adjusting the increased volume of the downlink voice data to a second threshold in response to the determining that the increased volume of the downlink voice data is greater than or equal to the second threshold; and
determining whether the target parameter is greater than or equal to the fourth preset value in response to the determining that the increased volume of the downlink voice data is less than the second threshold.

10. The volume adjustment method of claim 9, further comprising decreasing the volume of the downlink voice data in response to the determining that the target parameter is less than the fourth preset value and that the volume parameter of the background noise is decreasing.

11. The volume adjustment method of claim 10, wherein the volume parameter of the background noise is decreasing comprises a decreased value of the volume parameter of the background noise is greater than or equal to a fifth preset value.

12. The volume adjustment method of claim 1, wherein adjusting the volume of the downlink voice data comprises:
determining that a difference between a fourth threshold and the volume of the downlink voice data is greater than or equal to a sixth preset value;
adjusting the volume of the downlink voice data based on the sound data using a first step size in response to the determining that the difference between the fourth threshold and the volume of the downlink voice data is greater than or equal to the sixth preset value; and
adjusting the volume of the downlink voice data based on the sound data using a second step size in response to the determining that the difference between the fourth threshold and the volume of the downlink voice data is less than the sixth preset value, wherein the second step size is less than the first step size.

13. The volume adjustment method of claim 1, wherein after adjusting the volume of the downlink voice data, the volume adjustment method further comprises triggering prompt information, wherein the prompt information comprises a visual cue or an auditory cue, and wherein the prompt information prompts an adjustment already made to the volume of the downlink voice data.

14. The volume adjustment method of claim 1, further comprising:
detecting indication information of a user; and
stop adjusting the volume of the downlink voice data in response to the detecting the indication information of the user, wherein the indication information instructs to increase or decrease the volume of the downlink voice data.

15. A terminal, comprising:
a bus;
at least one microphone coupled to the bus;
a memory coupled to the bus and configured to store computer executable instructions; and
a processor coupled to the bus and configured to execute the computer executable instructions to cause the terminal to:
collect, using the at least one microphone, sound data during a voice conversation, wherein the sound data comprises uplink voice data and background noise;
determine whether a volume parameter of the background noise is greater than or equal to a first preset value;
adjust the volume of downlink voice data based on the volume parameter of the background noise in response to determining that the volume parameter of the background noise is greater than or equal to the first preset value; and
adjust the volume of the downlink voice data based on a volume parameter of the sound data in response to determining that the volume parameter of the background noise is less than the first preset value.

16. The terminal of claim 15, wherein when adjusting the volume of the downlink voice data, the processor is further configured to execute the computer executable instructions to cause the terminal to adjust the volume of the downlink voice data based on a volume parameter of the sound data, and wherein the volume parameter describes a volume value of the sound data.

17. The terminal of claim 16, wherein the volume parameter comprises at least one of an energy value, a power value, or an average volume value of the sound data.

18. The terminal of claim 16, wherein when adjusting the volume of the downlink voice data, the processor is further configured to execute the computer executable instructions to cause the terminal to:
increase the volume of the downlink voice data when the volume parameter of the sound data increases or when the volume parameter of the sound data within a preset duration is greater than or equal to a second preset value;
adjust the volume of the downlink voice data to a first threshold when an increased volume of the downlink voice data is greater than or equal to the first threshold; and
determine whether the volume parameter of the sound data increases or whether the volume parameter of the sound data within the preset duration is greater than or equal to the second preset value when the increased volume of the downlink voice data is less than the first threshold.

19. A computer program product comprising computer-executable instructions for storage on a non-transitory computer-readable storage medium that, when executed by a processor, cause an apparatus to:
collect sound data during a voice conversation, wherein the sound data comprises uplink voice data and background noise;
determine whether a volume parameter of the background noise is greater than or equal to a first preset value;
adjust the volume of downlink voice data based on the volume parameter of the background noise in response to determining that the volume parameter of the background noise is greater than or equal to the first preset value; and adjust the volume of the downlink voice data based on a volume parameter of the sound data in response to determining that the volume parameter of the background noise is less than the first preset value.

20. The computer program product of claim 19, wherein the instructions, when executed by a processor when adjusting the volume of the downlink voice data, cause the terminal to:

increase the volume of the downlink voice data when the volume parameter of the sound data increases or when the volume parameter of the sound data within a preset duration is greater than or equal to a second preset value;

adjust the volume of the downlink voice data to a first threshold when an increased volume of the downlink voice data is greater than or equal to the first threshold; and determine whether the volume parameter of the sound data increases or whether the volume parameter of the sound data within the preset duration is greater than or equal to the second preset value when the increased volume of the downlink voice data is less than the first threshold.

* * * * *